United States Patent
Fong et al.

(10) Patent No.: US 11,706,752 B2
(45) Date of Patent: Jul. 18, 2023

(54) SEMI-PERSISTENT SCHEDULING (SPS) FOR SIDELINK GROUPCAST

(71) Applicant: QUALCOMM Incorporated, San Diego, CA (US)

(72) Inventors: Lik Hang Silas Fong, Bridgewater, NJ (US); Piyush Gupta, Bridgewater, NJ (US); Xiaojie Wang, Hillsborough, NJ (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 99 days.

(21) Appl. No.: 17/323,504

(22) Filed: May 18, 2021

(65) Prior Publication Data
US 2022/0015109 A1 Jan. 13, 2022

Related U.S. Application Data

(60) Provisional application No. 63/049,902, filed on Jul. 9, 2020.

(51) Int. Cl.
*H04W 72/12* (2023.01)
*H04W 76/11* (2018.01)
(Continued)

(52) U.S. Cl.
CPC ......... *H04W 72/121* (2013.01); *H04L 1/0061* (2013.01); *H04L 1/1819* (2013.01);
(Continued)

(58) Field of Classification Search
CPC ........... H04W 72/121; H04W 72/1205; H04W 72/1226; H04W 72/1242; H04W 72/1247;
(Continued)

(56) References Cited

U.S. PATENT DOCUMENTS

2018/0219649 A1* 8/2018 Ying .................. H04L 1/08
2018/0234888 A1* 8/2018 Yasukawa ............... H04W 4/40
(Continued)

FOREIGN PATENT DOCUMENTS

WO WO-2019148376 A1 8/2019
WO WO-2020263570 A1 * 12/2020 ............ H04W 16/14

OTHER PUBLICATIONS

International Search Report and Written Opinion—PCT/US2021/036411—ISA/EPO—dated Oct. 15, 2021.
(Continued)

*Primary Examiner* — Phong La
(74) *Attorney, Agent, or Firm* — Norton Rose Fulbright LLP and Qualcomm Incorporated

(57) ABSTRACT

Systems and methods for implementing semi-persistent scheduling (SPS) transmission of periodic messages via one or more sidelinks are described. SPS for a sidelink groupcast may be activated and/or deactivated using SPS control signaling for the sidelink groupcast. SPS control signaling utilized for activating/deactivating SPS for a sidelink groupcast may include a SPS indicator (e.g., conveyed at least in part via SCI format 0-1 message), an activation/deactivation indicator (e.g., conveyed at least in part via SCI format 0-1 message and/or SCI format 0-2 message), and/or a configuration index (e.g., conveyed at least in part via SCI format 0-1 message and/or SCI format 0-2 message). Other aspects and features are also claimed and described.

30 Claims, 8 Drawing Sheets

(51) Int. Cl.
*H04W 72/121* (2023.01)
*H04W 72/1263* (2023.01)
*H04L 1/1812* (2023.01)
*H04L 1/00* (2006.01)
*H04W 72/20* (2023.01)
*H04W 92/18* (2009.01)

(52) U.S. Cl.
CPC ....... *H04W 72/1263* (2013.01); *H04W 72/20* (2023.01); *H04W 76/11* (2018.02); *H04W 92/18* (2013.01)

(58) Field of Classification Search
CPC ......... H04W 72/1257; H04W 72/1278; H04W 72/1263; H04W 72/12; H04W 72/14; H04W 72/04; H04W 72/06; H04W 72/048; H04W 72/0493; H04W 76/11; H04W 76/08; H04W 76/19; H04W 76/12; H04W 76/15; H04W 92/18; H04W 92/16; H04L 1/1819; H04L 1/1816; H04L 1/1812; H04L 1/18; H04L 1/0064; H04L 1/0061; H04L 1/0056; H04L 1/0058; H04L 1/0059; H04L 1/06; H04L 1/08; H04L 1/10
See application file for complete search history.

(56) References Cited

U.S. PATENT DOCUMENTS

| | | | | |
|---|---|---|---|---|
| 2020/0022089 | A1* | 1/2020 | Guo | H04W 52/242 |
| 2020/0029318 | A1* | 1/2020 | Guo | H04W 72/042 |
| 2020/0100215 | A1* | 3/2020 | Li | H04W 74/002 |
| 2020/0107170 | A1* | 4/2020 | Chen | H04L 5/0055 |
| 2020/0413295 | A1* | 12/2020 | Li | H04W 72/0453 |
| 2021/0136731 | A1* | 5/2021 | Li | H04L 5/0053 |
| 2021/0306824 | A1* | 9/2021 | Li | H04L 1/1887 |
| 2022/0007403 | A1* | 1/2022 | Li | H04W 72/1289 |
| 2022/0015109 | A1* | 1/2022 | Fong | H04W 72/121 |
| 2022/0015133 | A1* | 1/2022 | Fong | H04L 1/0061 |
| 2022/0070876 | A1* | 3/2022 | Bangolae | H04W 24/08 |
| 2022/0086860 | A1* | 3/2022 | Panteleev | H04W 4/40 |
| 2022/0124466 | A1* | 4/2022 | Ali | H04W 4/40 |
| 2022/0159628 | A1* | 5/2022 | Bangolae | H04W 72/04 |
| 2022/0190886 | A1* | 6/2022 | Islam | H04W 76/28 |
| 2022/0191934 | A1* | 6/2022 | Miao | H04W 74/002 |
| 2022/0247539 | A1* | 8/2022 | Luo | H04W 76/00 |

OTHER PUBLICATIONS

LG Electronics Inc: "Support of Unicast and Groupcast for NR Sidelink Mode 1," 3GPP Draft, 3GPP TSG-RAN WG2 Meeting #104, R2-1818296 Support of Unicast and Groupcast for NR Sidelink Mode 1, 3rd Generation Partnership Project (3GPP), Mobile Competence Centre, 650, Route Des Lucioles, F-06921, Sophia-Antipolis Cedex, France, vol. RAN WG2. No. Spokane, USA, Nov. 12, 2018-Nov. 16, 2018, Nov. 12, 2018 (Nov. 12, 2018), XP051557797, 3 pages, Retrieved from the Internet: URL: http://www.3gpp.org/ftp/Meetings%5F3GPP%5FSYNC/RAN2/Docs/R2%2D1818296%2Ezip [retrieved on Nov. 12, 2018] section 2, p. 1-p. 2.

* cited by examiner

SEMI-PERSISTENT SCHEDULING (SPS) FOR SIDELINK GROUPCAST

CROSS-REFERENCE TO RELATED APPLICATIONS

This application claims the benefit of U.S. Provisional Patent Application No. 63/049,902, entitled, "SEMI-PERSISTENT SCHEDULING (SPS) FOR SIDELINK GROUPCAST," filed on Jul. 9, 2020, the disclosure of which is expressly incorporated by reference herein in its entirety.

TECHNICAL FIELD

Aspects of the present disclosure relate generally to wireless communication systems, and more particularly, to user equipment (UE) sidelink communication. Certain embodiments of the technology discussed below can enable and provide semi-persistent scheduling (SPS) for sidelink groupcast.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

In many scenarios the base station to UE link does not fully exploit the potential capabilities of the baseband UE hardware. For example, the UE form factor may limit the RF capabilities of the UE and hence maximum practical data rate. Approaches used to address such RF limitations have included techniques for relaying user traffic. An integrated access and backhaul (IAB) configuration, for example, provides a layer 2 (i.e., data link layer) communication solution where both backhaul and access are controlled by the network (e.g., base station). A consumer premises equipment (CPE) configuration provides a layer 3 (i.e., network layer) communication solution where backhaul is controlled by the network (e.g., base station) and access is controlled by the CPE (e.g., UE).

SUMMARY

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication is provided. The method may include transmitting, by a first user equipment (UE), a groupcast indicator for a sidelink groupcast indicating that corresponding sidelink transmissions are groupcast to a plurality of UEs. The method may also include transmitting, by the first UE, semi-persistent scheduling (SPS) control signaling for the sidelink groupcast including a SPS indicator, an activation state indicator, and a configuration index.

In an additional aspect of the disclosure, an apparatus configured for wireless communication is provided. The apparatus may include means for transmitting, by a first UE, a groupcast indicator for a sidelink groupcast indicating that corresponding sidelink transmissions are groupcast to a plurality of UEs. The apparatus may also include means for transmitting, by the first UE, SPS control signaling for the sidelink groupcast including a SPS indicator, an activation state indicator, and a configuration index.

In an additional aspect of the disclosure, a non-transitory computer-readable medium having program code recorded thereon for wireless communication is provided. The program code may include code to transmit, by a first UE, a groupcast indicator for a sidelink groupcast indicating that corresponding sidelink transmissions are groupcast to a plurality of UEs. The program code may also include code to transmit, by the first UE, SPS control signaling for the sidelink groupcast including a SPS indicator, an activation state indicator, and a configuration index.

In an additional aspect of the disclosure, an apparatus configured for wireless communication is provided. The apparatus includes at least one processor, and a memory coupled to the processor. The processor may be configured to cause the apparatus to transmit a groupcast indicator for a sidelink groupcast indicating that corresponding sidelink transmissions by a first UE are groupcast to a plurality of UEs. The processor may also be configured to cause the apparatus to transmit SPS control signaling for the sidelink groupcast including a SPS indicator, an activation state indicator, and a configuration index.

In accordance with aspects of the disclosure, the foregoing systems, methods, and apparatuses may be implemented in combination with one or more additional features, such as the following features whether alone or in combination. For example, the above systems, methods, and apparatuses may include the SPS indicator being transmitted at least in part via one or more fields of a sidelink control information (SCI) format 0-1 message. The above systems, methods, and apparatuses may include a cyclic redundancy code (CRC) included in a field of the SCI format 0-1 message being scrambled using a SPS radio network temporary identifier (RNTI) provides the SPS indicator. The above systems, methods, and apparatuses may include the SPS RNTI being a common sidelink SPS RNTI (SL-SPS-RNTI) common to all UEs in sidelink communication with the first UE. The above systems, methods, and apparatuses may include the common SL-SPS-RNTI indicating that the SCI format 0-1 message and a corresponding SCI format 0-2 message contain SPS information for the sidelink groupcast. The above systems, methods, and apparatuses may include the SPS RNTI being a sidelink SPS group-specific RNTI (SL-SPS-group-RNTI) for a group of groupcast receiver UEs consisting of the plurality of UEs. The above systems, methods, and apparatuses may include message destination group identifiers and zone identifiers in a SCI format 0-2 message corresponding to the SCI format 0-1 message being made available for purposes other than destination group identifiers and zone identifiers when a group indicated by the SL-SPS-group-RNTI coincides with a group indicated in the corresponding SCI format 0-2 message. The above systems, methods, and apparatuses may include a field of the SCI format 0-1 message being defined for indicating the presence of SPS information in the SCI format 0-1 message and a corresponding SCI format 0-2 message providing the SPS indicator. The above systems, methods, and apparatuses may include the activation state indicator indicating either activation of the SPS of the sidelink groupcast or deactivation of the SPS of the sidelink groupcast. The above systems, methods, and apparatuses may include the activation state indicator being transmitted at least in part via one or more fields of a SCI format 0-1 message, one or more fields of a SCI format 0-2 message, or a combination thereof. The above systems, methods, and apparatuses may include a combination of contents of at least one field of the SCI format 0-1 message and at least one field of the SCI format 0-2 message providing the activation state indicator. The above systems, methods, and apparatuses may include the contents of the at least one field of the SCI format 0-1 message including contents indicating group SPS and the contents of the at least one field of the SCI format 0-2 message including a new data indicator. The above systems, methods, and apparatuses may include the activation state indicator indicating activation of the SPS of the sidelink groupcast when the contents of at least one field of the SCI format 0-1 message indicates group SPS, the contents of the at least one field of the SCI format 0-2 message include a new data field value of 0, and frequency and time resource assignments for the sidelink groupcast are feasible, and the activation state indicator indicating deactivation of the SPS of the sidelink groupcast when the contents of the at least one field of the SCI format 0-1 message indicates group SPS, the contents of the at least one field of the SCI format 0-2 message include a new data field value of 0, and frequency and time resource assignments for the sidelink groupcast are set to all 0s. The above systems, methods, and apparatuses may include a field of the SCI format 0-1 message or a field of the SCI format 0-2 message defined for indicating an activation state of the SPS of the sidelink groupcast providing the activation state indicator. The above systems, methods, and apparatuses may include the configuration index being transmitted at least in part via one or more fields of a SCI format 0-1 message, one or more fields of a SCI format 0-2 message, or a combination thereof. The above systems, methods, and apparatuses may include a combination of contents of a field of the SCI format 0-1 message indicating group SPS and a hybrid automatic repeat request (HARQ) process identification field specifying an index value providing the configuration index. The above systems, methods, and apparatuses may include a field of the SCI format 0-1 message or a field of the SCI format 0-2 message defined for indicating an index value of the configuration index providing the configuration index. The above systems, methods, and apparatuses may include the configuration index providing an index to one or more parameters of a set of parameters including one or more of a SPS radio network temporary identifier (RNTI), a periodicity of the sidelink groupcast, or a maximum number of times that a transport block (TB) for the sidelink groupcast can be transmitted. The above systems, methods, and apparatuses may include transmitting, by the first UE, a first SCI format 0-1 message for the sidelink groupcast, transmitting, by the first UE, a first SCI format 0-2 message for the sidelink groupcast, wherein the SPS control signaling for the sidelink groupcast transmitted by the first UE is included in the SCI format 0-1 message, the SCI format 0-2 message, or a combination thereof, and transmitting physical sidelink shared channel (PSSCH) groupcast data for the sidelink groupcast. The above systems, methods, and apparatuses may include the activation state indicator indicating activation of the SPS of the sidelink groupcast, monitoring for a feedback message from each UE of the plurality of UEs, and determining that activation of the SPS of the sidelink groupcast is incomplete if the feedback message has not been received from each UE of the plurality of UEs or that activation of the SPS of the sidelink groupcast is complete if the feedback message has been received from each UE of the plurality of UEs. The above systems, methods, and apparatuses may include subsequent PSSCH groupcast data transmissions for the sidelink groupcast being accompanied by the first SCI format 0-1 message and the second SCI format 0-2 message when it is determined that activation of the SPS of the sidelink groupcast is incomplete. The above systems, methods, and apparatuses may include subsequent PSSCH groupcast data transmissions for the sidelink groupcast being unaccompanied by a SCI format 0-1 message, a SCI format 0-2 message, or both when it is determined that activation of the SPS of the sidelink groupcast is complete. The above systems, methods, and apparatuses may include sidelink resources for the sidelink groupcast being scheduled by a base station in communication with the first UE, determining that SCI format 0-1 message contents and SCI format 0-2 message contents associated with an instance of the subsequent PSSCH groupcast data transmission are identical to contents of a respective one of the first SCI format 0-1 message and the first SCI format 0-2 message, and transmitting, by the first UE, the subsequent PSSCH groupcast data transmission for the sidelink groupcast unaccompanied by an instance of a SCI format 0-1 message and an instance of a SCI format 0-2 message. The above systems, methods, and apparatuses may include sidelink resources for the sidelink groupcast being scheduled by the first UE, determining that SCI format 0-1 message contents and SCI format 0-2 message contents associated with an instance of the subsequent PSSCH groupcast data transmission are identical to contents of a respective one of the first SCI format 0-1 message and the first SCI format 0-2 message, and transmitting, by the first UE, the subsequent PSSCH groupcast data transmission for the sidelink groupcast accompanied by an instance of a SCI format 0-1 message and unaccompanied by an instance of a SCI format 0-2 message. The above systems, methods, and apparatuses may include the activation state indicator indicating activation of the SPS of the sidelink groupcast, transmitting, by the first UE, a second SCI format 0-1 message for the sidelink groupcast, transmitting, by the first UE, a second SCI format 0-2 message for the sidelink groupcast, wherein the second SCI format 0-1 message, the second SCI format 0-2 message, or both include updated contents with respect to the first SCI format 0-1 message, the first SPS format 0-2 message, or both for reactivation of the SPS of the sidelink groupcast using a different SPS configuration, and transmitting subsequent PSSCH groupcast data for the sidelink groupcast. The above systems, methods, and apparatuses may include transmitting, by the first UE, a second SCI format 0-1 message for the sidelink groupcast, and transmitting, by the first UE, a second SCI format 0-2 message for the sidelink groupcast, wherein the second SCI format 0-1 message, the second SCI format 0-2 message, or a combination thereof provide an activation state indicator indicating deactivation of the SPS of the sidelink groupcast. The above systems, methods, and apparatuses may include determining, by the first UE, to retransmit a groupcast TB for the sidelink groupcast based on receiving a negative acknowledgement (NACK) for a PSSCH groupcast data transmission for the sidelink groupcast from a UE of the plurality of UEs. The above systems, methods, and apparatuses may include determining, by the first UE, to retransmit a groupcast TB for the sidelink groupcast based on failing to receive an acknowledgment (ACK) for a PSSCH groupcast data transmission for the sidelink groupcast from a UE of the plurality of UEs. The above systems, methods, and apparatuses may include allocating, by the first UE, resources for retransmission of a groupcast TB for the sidelink groupcast, retransmitting, by the first UE, the groupcast TB, wherein a same HARQ process identification used for original transmission of the groupcast TB is used for retransmitting the groupcast TB, and wherein retransmitting the TB includes transmitting, by the first UE, a second SCI format 0-1 message for the sidelink groupcast, transmitting, by the first UE, a second SCI format 0-2 message for the sidelink groupcast, wherein the second SCI format 0-1 message and the second SCI format 0-2 message carry the SPS control signaling for the sidelink groupcast, and retransmitting PSSCH groupcast data for the sidelink groupcast, wherein the second SCI format 0-1 message, the second SCI format 0-2 message, or both include one or more fields indicating that the PSSCH groupcast data is retransmitted data for the sidelink groupcast.

In one aspect of the disclosure, a method of wireless communication is provided. The method may include receiving, by a UE of a plurality of UEs in communication with a first UE, a groupcast indicator for a sidelink groupcast indicating that corresponding sidelink transmissions by the first UE are groupcast to the plurality of UEs. The method may also include receiving, by the UE of the plurality of UEs, SPS control signaling for the sidelink groupcast including a SPS indicator, an activation state indicator, and a configuration index.

In an additional aspect of the disclosure, an apparatus configured for wireless communication is provided. The apparatus may include means for receiving, by a UE of a plurality of UEs in communication with a first UE, a groupcast indicator for a sidelink groupcast indicating that corresponding sidelink transmissions by the first UE are groupcast to the plurality of UEs. The apparatus may also include means for receiving, by the UE of the plurality of UEs, SPS control signaling for the sidelink groupcast including a SPS indicator, an activation state indicator, and a configuration index.

In an additional aspect of the disclosure, a non-transitory computer-readable medium having program code recorded thereon for wireless communication is provided. The program code may include code to receive, by a UE of a plurality of UEs in communication with a first UE, a groupcast indicator for a sidelink groupcast indicating that corresponding sidelink transmissions by the first UE are groupcast to the plurality of UEs. The program code may also include code to receive, by the UE of the plurality of UEs, SPS control signaling for the sidelink groupcast including a SPS indicator, an activation state indicator, and a configuration index.

In an additional aspect of the disclosure, an apparatus configured for wireless communication is provided. The apparatus includes at least one processor, and a memory coupled to the processor. The processor may be configured to cause the apparatus to receive a groupcast indicator for a sidelink groupcast by a first UE to a plurality of UEs indicating that corresponding sidelink transmissions by the first UE are groupcast to the plurality of UEs. The processor may also be configured to cause apparatus to receive SPS control signaling for the sidelink groupcast including a SPS indicator, an activation state indicator, and a configuration index.

In accordance with aspects of the disclosure, the foregoing systems, methods, and apparatuses may be implemented in combination with one or more additional features, such as the following features whether alone or in combination. For example, the above systems, methods, and apparatuses may include the SPS indicator being received at least in part via one or more fields of a sidelink control information (SCI) format 0-1 message. The above systems, methods, and apparatuses may include CRC included in a field of the SCI format 0-1 message being scrambled using a SPS RNTI provides the SPS indicator. The above systems, methods, and apparatuses may include the SPS RNTI being a common SL-SPS-RNTI common to all UEs in sidelink communication with the first UE. The above systems, methods, and apparatuses may include the common SL-SPS-RNTI indicates that the SCI format 0-1 message and a corresponding SCI format 0-2 message containing SPS information for the sidelink groupcast. The above systems, methods, and apparatuses may include the SPS RNTI being a SL-SPS-group-RNTI for a group of groupcast receiver UEs consisting of the plurality of UEs. The above systems, methods, and apparatuses may include message destination group identifiers and zone identifiers in a SCI format 0-2 message corresponding to the SCI format 0-1 message being used for purposes other than destination group identifiers and zone identifiers when a group indicated by the SL-SPS-group-RNTI coincides with a group indicated in the corresponding SCI format 0-2 message. The above systems, methods, and apparatuses may include a field of the SCI format 0-1 message being defined for indicating the presence of SPS information in the SCI format 0-1 message and a corresponding SCI format 0-2 message providing the SPS indicator. The above systems, methods, and apparatuses may include the activation state indicator indicating either activation of the SPS of the sidelink groupcast or deactivation of the SPS of the sidelink groupcast. The above systems, methods, and apparatuses may include the activation state indicator being received at least in part via one or more fields of a SCI format 0-1 message, one or more fields of a SCI format 0-2 message, or a combination thereof. The above systems, methods, and apparatuses may include a combination of contents of at least one field of the SCI format 0-1 message and at least one field of the SCI format 0-2 message providing the activation state indicator. The above systems, methods, and apparatuses may include the contents of the at least one field of the SCI format 0-1 message including contents indicating group SPS and the contents of the at least one field of the SCI format 0-2 message including a new data indicator. The above systems, methods, and apparatuses may include the activation state indicator indicating activation of the SPS of the sidelink groupcast when the contents of the at least one field of the SCI format 0-1 message indicates group SPS, the contents of the at least one field of the SCI format 0-2 message includes a new data field value of 0, and frequency and time resource assignments for the sidelink groupcast are feasible, and the activation state indicator indicating deactivation of the SPS of the sidelink groupcast when the contents of the at least one field of the SCI format 0-1 message indicates group SPS, the contents of the at least one field of the SCI format 0-2 message includes a new data field value of 0, and frequency and time resource assignments for the sidelink groupcast are set to all 0s. The above systems, methods, and apparatuses may include a field of the SCI format 0-1 message or a field of the SCI format 0-2 message defined for indicating an activation state of the SPS of the sidelink groupcast providing the activation state indicator. The above systems, methods, and apparatuses may include the configuration index being received at least in part via one or more fields of a SCI format 0-1 message, one or more fields of a SCI format 0-2 message, or a combination thereof. The above systems, methods, and apparatuses may include a combination of contents of the SCI format 0-1 message indicating group SPS and a HARQ process identification field specifying an index value providing the configuration index. The above systems, methods, and apparatuses may include a field of the SCI format 0-1 message or a field of the SCI format 0-2 message defined for indicating an index value of the configuration index providing the configuration index. The above systems, methods, and apparatuses may include the configuration index providing an index to one or more parameters of a set of parameters including one or more of a SPS RNTI, a periodicity of the sidelink groupcast, or a maximum number of times that a TB for the sidelink groupcast can be transmitted. The above systems, methods, and apparatuses may include receiving, by the UE of the plurality of UEs, a first SCI format 0-1 message for the sidelink groupcast, receiving, by the UE of the plurality of UEs, a first SCI format 0-2 message for the sidelink groupcast determining if the first SCI format 0-1 message and the first SCI format 0-2 message correspond to the sidelink transmissions of the sidelink groupcast to the plurality of UEs, analyzing the first SCI format 0-1 message, the first SCI format 0-2 message, or both for the activation state indicator indicating activation of the SPS of the sidelink groupcast or deactivation of the SPS of the sidelink groupcast. The above systems, methods, and apparatuses may include the activation state indicator indicating activation of the SPS of the sidelink groupcast, and decoding, by the UE of the plurality of UEs, PSSCH groupcast data for the sidelink groupcast. The above systems, methods, and apparatuses may include transmitting, by the UE of the plurality of UEs, an ACK or NACK for the decoding the PSSCH groupcast data irrespective of a NACK only option for PSSCH groupcast data decoding. The above systems, methods, and apparatuses may include storing, by the UE of the plurality of UEs, configuration parameters for the SPS, contents of the first SCI format 0-1 message, and contents of the first SCI format 0-2 message, receiving, by the UE of the plurality of UEs, PSSCH groupcast data in accordance with the SPS, and transmitting, by the UE of the plurality of UEs, ACKs or NACKs for the PSSCH groupcast data in accordance with the SPS configuration parameters and the contents of first SCI format 0-1 message and the first SCI format 0-2 message stored by the UE of the plurality of UEs. The above systems, methods, and apparatuses may include determining, by the UE of the plurality of UEs, that the SPS of the sidelink groupcast is new based at least in part on the configuration index, and storing, by the UE of the plurality of UEs, periodic procedures of the SPS in a SPS periodic procedures database. The above systems, methods, and apparatuses may include determining, by the UE of the plurality of UEs, that the SPS of the sidelink groupcast is a reactivation of a SPS based at least in part on the configuration index, and updating, by the UE of the plurality of UEs, periodic procedures of the SPS in a SPS periodic procedures database. The above systems, methods, and apparatuses may include the activation state indicator indicating deactivation of the SPS of the sidelink groupcast, and cancelling, by the UE of the plurality of UEs, periodic procedures of the SPS, wherein the UE of the plurality of UEs ceases to periodic monitoring of the PSSCH for data of the sidelink groupcast. The above systems, methods, and apparatuses may include a value for the activation state indicator indicating activation of the SPS of the sidelink groupcast, receiving, by the UE of the plurality of UEs, a second SCI format 0-1 message for the sidelink groupcast, receiving, by the UE of the plurality of UEs, a second SCI format 0-2 message for the sidelink groupcast, determining, by the UE of the plurality of UEs, that periodic procedures of the SPS remain valid based at least in part on the second SCI format 0-1 message and the second SCI format 0-2 message failing to include SPS information for the sidelink groupcast, and monitoring the PSSCH for data of the sidelink groupcast according to the periodic procedures of the SPS.

Other aspects, features, and embodiments will become apparent to those of ordinary skill in the art, upon reviewing the following description of specific, exemplary embodiments in conjunction with the accompanying figures. While features may be discussed relative to certain aspects and figures below, all embodiments can include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
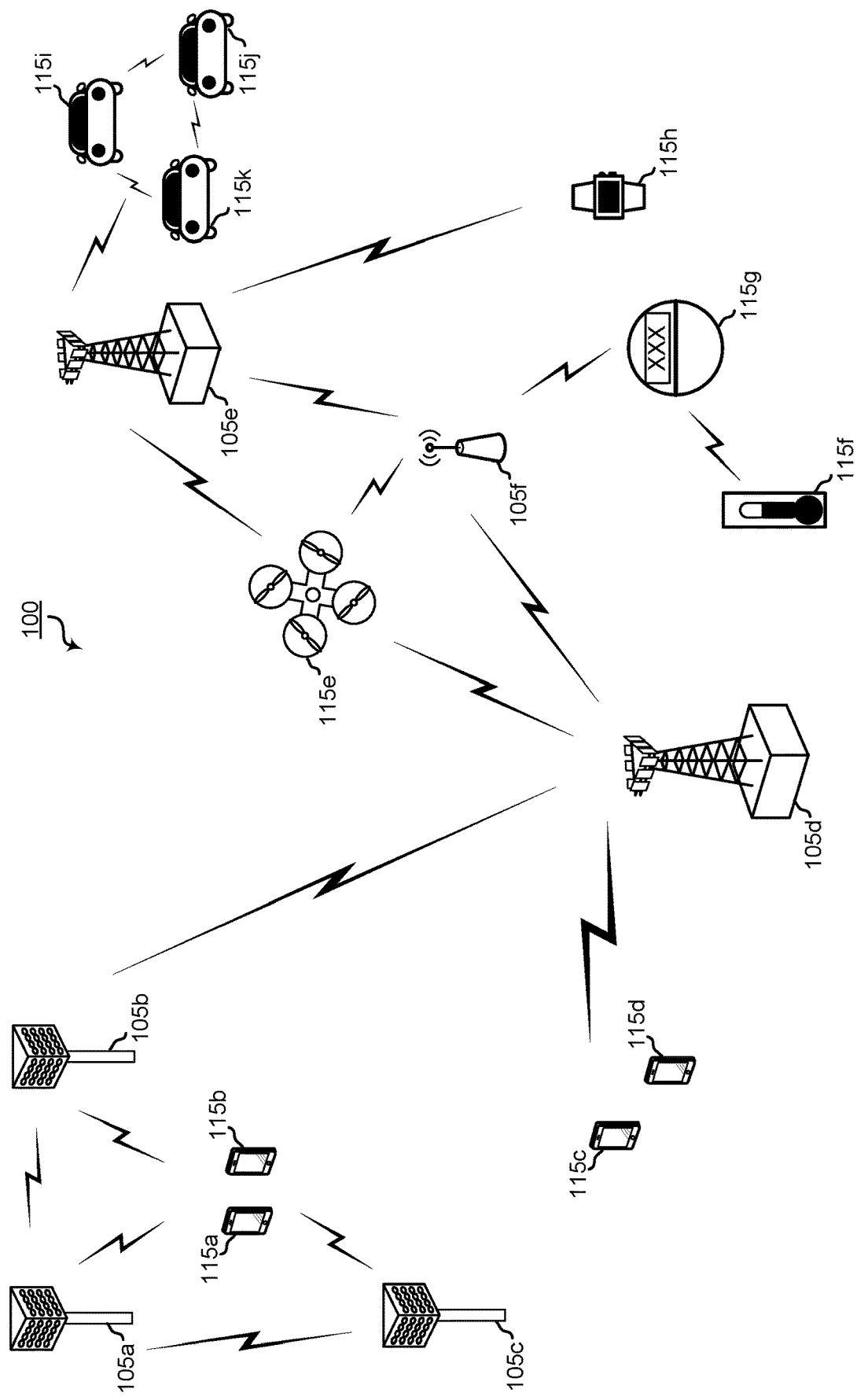
FIG. 1 is a block diagram illustrating details of an example of a wireless communication system according to some embodiments of the present disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The Third Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. Additionally, an operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "$3^{rd}$ Generation Partnership Project" (3GPP), and cdma2000 is described in documents from an organization named "$3^{rd}$ Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects descried with reference to one technology may be understood to be applicable to another technology. Indeed, one or more aspects of the present disclosure are related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km2), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km2), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 is a block diagram illustrating details of an example wireless communication system. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as user equipment (UE) in standards and specifications promulgated by the 3GPP, such apparatus may additionally or otherwise be referred to by those skilled in the art as a mobile station (MS), a subscriber station, consumer premises equipment (CPE), a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component device/module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, a personal digital assistant (PDA), a set-top box, and a streaming content device. A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink and/or uplink, or desired transmission between base stations, and backhaul transmissions between base stations. UEs may operate as base stations or other network nodes in some scenarios. Backhaul communication between base stations of wireless network 100 may occur using wired and/or wireless communication links.

In operation at wireless network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD/FDD communications, such as in a vehicle-to-vehicle (V2V) mesh network between UEs 115i-115k communicating with macro base station 105e.

Figure 2:
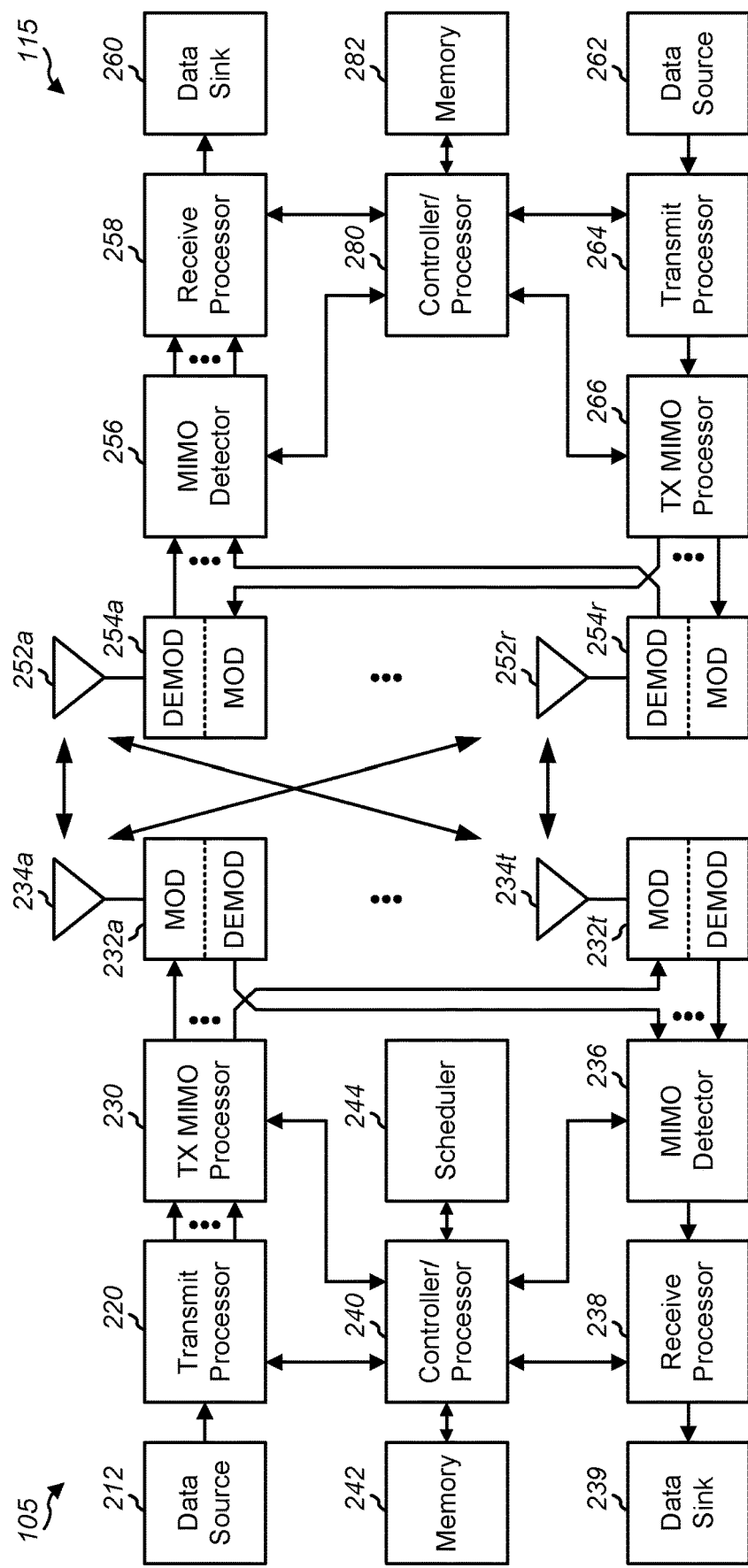
FIG. 2 is a block diagram conceptually illustrating an example design of a base station and a UE configured according to some embodiments of the present disclosure.

FIG. 2 shows a block diagram conceptually illustrating an example design of a base station 105 and a UE 115, which may be any of the base stations and one of the UEs in FIG. 1. For a restricted association scenario (as mentioned above), base station 105 may be small cell base station 105f in FIG. 1, and UE 115 may be UE 115c or 115d operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, the antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller/processor 280.

On the uplink, at UE 115, transmit processor 264 may receive and process data (e.g., for the physical uplink shared channel (PUSCH)) from data source 262 and control information (e.g., for the physical uplink control channel (PUCCH)) from controller/processor 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at base station 105 and UE 115, respectively. Controller/processor 240 and/or other processors and modules at base station 105 and/or controller/processor 280 and/or other processors and modules at UE 115 may perform or direct the execution of various processes for the techniques described herein, such as to perform or direct the execution illustrated in FIGS. 8 and 9, and/or other processes for the techniques described herein. Memories 242 and 282 may store data and program codes for base station 105 and UE 115, respectively. Scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Various techniques for carrying user traffic between network nodes have been utilized for facilitating communications in wireless networks. For example, integrated access and backhaul (IAB) or consumer premises equipment (CPE) communication configurations have been implemented in some scenarios.

Figure 3:
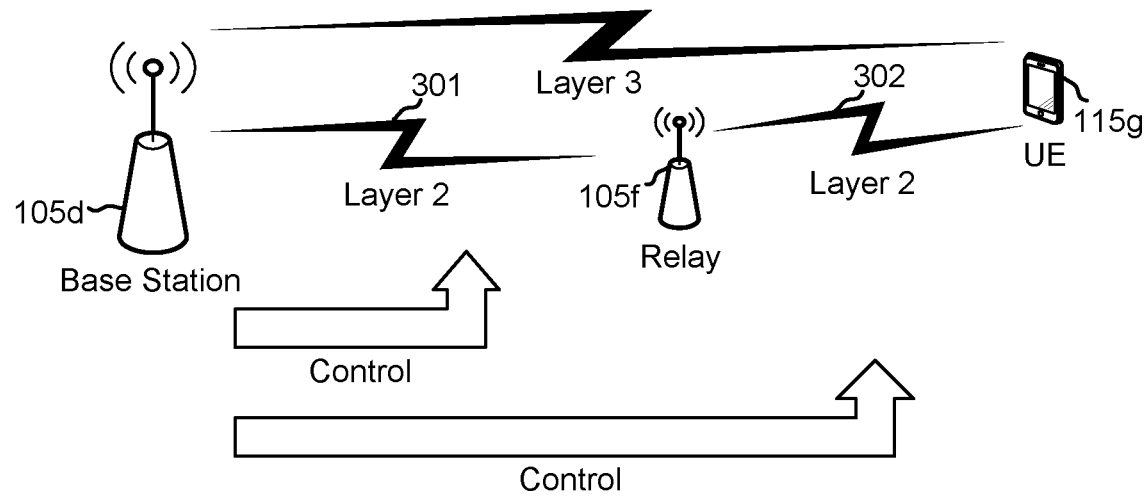
FIG. 3 is an example integrated access and backhaul (IAB) communication configuration according to some embodiments of the present disclosure.

An example of an IAB communication configuration is shown in FIG. 3, wherein an intermediate node (e.g., base station 105f providing a small cell operating as a relay) communicates user data between a network node (e.g., base station 105d) and another device (e.g., UE 115g). As shown in the illustrated example, the IAB communication configuration provides a layer 2 (i.e., data link layer) communication solution where both backhaul (e.g., provided by link 301) between the intermediate node and network node and access (e.g., provided by link 302) between the intermediate node and the other device are controlled by the network (e.g., base station 105*d*).

Figure 4:
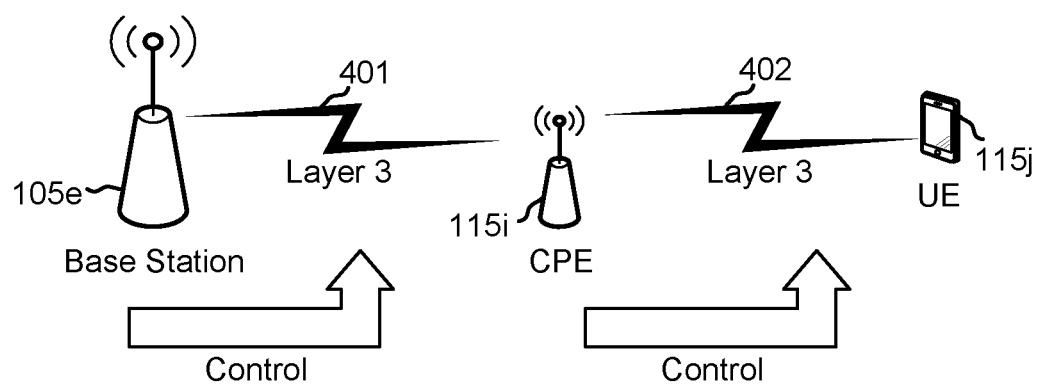
FIG. 4 is an example consumer premises equipment (CPE) communication configuration according to some embodiments of the present disclosure.

An example of a CPE communication configuration is shown in FIG. 4, wherein an intermediate node (e.g., CPE comprising UE 115*i*) communicates user data (e.g., received from a network node, such as base station 105*e*, and/or originated by the intermediate node) to another device (e.g., UE 115*j*). As shown in the illustrated example, the CPE communication configuration provides a layer 3 (i.e., network layer) communication solution where backhaul (e.g., provided by link 401) between the intermediate node and network node is controlled by the network (e.g., base station 105*e*) and access (e.g., provided by link 402) between the intermediate node and the other device is controlled by the intermediate node (e.g., UE 115*i*). A CPE providing an intermediate node of a CPE communication configuration may comprise various forms of equipment, such as a variety of UE devices (e.g., smartphone, set-top box, wireless router or other access point, etc.). Although intermediate nodes of CPE communication configurations are referred to herein as UEs, it should be understood that that an intermediate node of CPE communication configurations are not limited to any particular UE configuration or even to devices typically considered UEs.

As illustrated by the CPE communication configuration of FIG. 4, in addition to communicating with the network (e.g., base station 105*e*), a UE (e.g., UE 115*i*) may implement a sidelink (i.e., communication link directly between UEs) with respect to one or more other UEs (e.g., UE 115*j*). UE 115*i* may communicate directly with base station 105*e* using a UE to UMTS (Uu) interface. A sidelink may, for example, be implemented using a UE to UE interface such as a PC5 interface of a vehicle-to-everything (V2X) mesh network.

Existing V2X interface protocols provide for dynamic and configured grants for sidelinks (e.g., a physical sidelink control channel (PSCCH) and/or physical sidelink shared channel) using a PC5 interface. A dynamic grant (DG) may provide a one-time grant of sidelink resources, such as responsive to instantaneous demand/need for sidelink communication. A configured grant (CG) may provide a grant of sidelink resources enabling continued/periodic/repeated sidelink communication. A first type of sidelink resource grant (Type 1) of the V2X interface protocols uses radio resource control (RRC) to configure a UE with resources of a CG. A second type of sidelink resource grant (Type 2) of the V2X interface protocols uses downlink control information (DCI) over a PDCCH to configure a UE with resources of a DG or a CG. For example, the DCI may be a DG and provide allocation of resources to be used for sidelink communication. Alternatively, the DCI may be a CG and activate/deactivate a CG for sidelink communication.

Figure 5A:
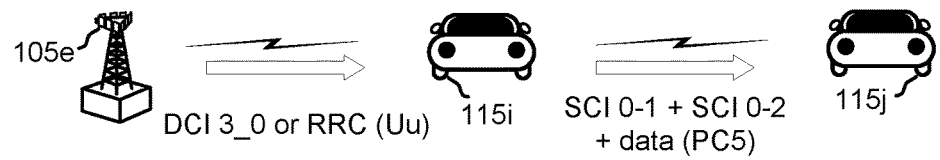
FIGS. 5A and 5B show an example of sidelink resource grants in accordance with vehicle-to-everything (V2X) transmission mode 1 according to some embodiments of the present disclosure.

The base station (e.g., base station 105*e*) schedules sidelink resources to be used by a UE (e.g., UE 115*i*) for sidelink transmissions via a PC5 connection to another UE (e.g., UE 115*j*) in V2X transmission mode 1 (Mode 1), as illustrated in FIG. 5A. Mode 1 supports Type 1 DGs and CGs and Type 2 CGs. A Type 1 CG may, for example, may be activated via RRC signaling from the base station. Type 2 DGs and CGs may be conveyed using a DCI format 3_0 message over PDCCH. For example, the DCI may comprise a DG and provide allocation of resources to use over a sidelink. As another example, the DCI can activate or deactivate a Type 2 CG for a sidelink. A UE (e.g., UE 115*i*) may report activation/deactivation of a sidelink using media access control-control element (MAC-CE) signaling.

Figure 5B:
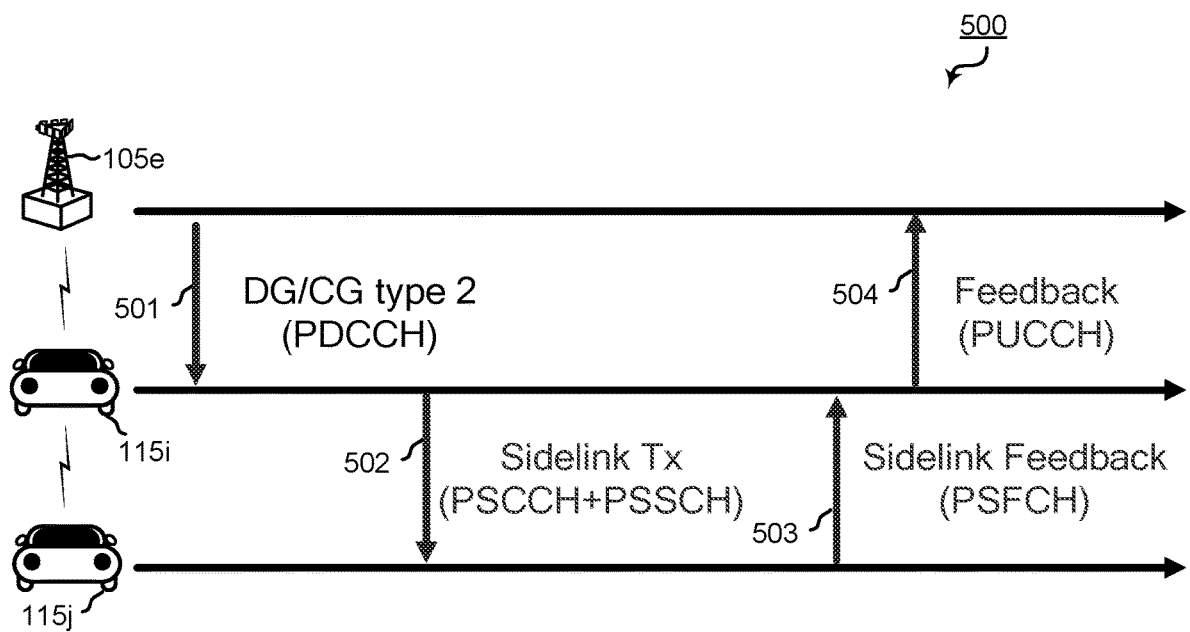

FIG. 5B illustrates a physical-layer procedure flow (procedure flow 500) for Mode 1 using a sidelink resource grant in accordance with the above mentioned V2X interface DG/CG Type 2 protocols. Procedure flow 500 of FIG. 5B is described with reference to a V2X mesh network between UEs 115*i* and 115*j* communicating with macro base station 105*e*, as shown in wireless network 100 of FIG. 1. It should be understood, however, that the procedure flow may be implemented with respect to various UEs and UE configurations.

In procedure flow 500 of FIG. 5B, base station 105*e* uses DCI, provided according to DCI format 3_0 and which is configured to correspond to UE 115*i* (e.g., sidelink transmitter (TX) UE), to deliver a DG/CG Type 2 to UE 115*i* at procedure 501. DCI format 3_0 provides fields for time gap, hybrid automatic repeat request (HARQ) process identifier (ID), new data indicator, lowest index of the subchannel allocation to the initial transmission, first-stage sidelink control information (SCI) format 0-1 fields (including frequency resource assignment and time resource assignment), physical sidelink feedback channel (PSFCH) to HARQ feedback timing indicator, and PUCCH resource indicator, as well as configuration index in the case of CG. Base station 105*e* prepares the DCI with a sidelink-radio network temporary identifier (SL-RNTI) for UE 115*i*, in the case of DG, or sidelink-configured scheduling-radio network temporary identifier (SL-CS-RNTI) for UE 115*i*, in the case of CG, to configure the DCI to correspond to UE 115*i*. In particular, the cyclic redundancy check (CRC) of the DCI is scrambled by SL-RNTI or SL-CS-RNTI for UE 115*i* in order to deliver a DG/CG Type 2 to the UE (e.g., sidelink TX UE).

In the case of CG, UE 115*i* (e.g., sidelink TX UE) reports the activation (or deactivation) of a sidelink (not shown in procedure flow 500). In particular, activation/deactivation of a CG sidelink is reported through MAC-CE. MAC-CE reporting is also used by UE 115*i* to provide sidelink buffer status reports (BSRs) to base station 105*e*. For example, UE 115*i* may have provided a BSR indicating data for sidelink communication is contained in the UE buffer, resulting in base station 115*e* initiating the sidelink resource grant of procedure 501.

At procedure 502 of procedure flow 500, UE 115*i* (e.g., sidelink TX UE) uses SCI, provided according to SCI format 0-1 (e.g., for scheduling physical sidelink shared channel (PSSCH) and second-stage SCI on PSSCH) and SCI format 0-2 (e.g., for decoding PSSCH), to schedule PSSCH and transmit data through PSSCH to UE 115*j* (e.g., sidelink receiver (RX) UE) according to the DG/CG Type 2 (sidelink resource grant of procedure 501). SCI format 0-1 provides fields for priority, frequency resource assignment, time resource assignment, resource reservation period, demodulation reference signal (DMRS) pattern, second-stage SCI format (broadcast, unicast, groupcast), Beta_offset indicator, number of DMRS port, modulation and coding scheme (MCS), and a reserved field. SCI format 0-2 provides fields for HARQ process ID, new data indicator, redundancy version, source ID, destination ID, and channel state information (CSI) request, also if the second-stage SCI format field in the corresponding SCI provided in SCI format 0-1 indicates type 1 groupcast zone ID and communication range requirement fields are present. MCS selection is up to the sidelink TX UE (e.g., UE 115*i* in procedure flow 500), within limits set by the base station (e.g., base station 105*e*).

It can be seen from the foregoing that the base station schedules node resources for the sidelink TX UE (procedure 501) and the sidelink TX UE implements one or more sidelinks with sidelink RX UEs using some or all of the scheduled resources (procedure 502). However, the base station does not control how the sidelink TX UE (e.g., UE 115i) uses the resources and which UEs are selected as the sidelink RX UEs by the sidelink TX UE.

Continuing with procedure flow 500 of FIG. 5B, UE 115j (e.g., sidelink RX UE) provides sidelink feedback to UE 115i (e.g., sidelink TX UE) at procedure 503. As noted above, three transmission types are specified in SCI 0-1: unicast; broadcast; and groupcast. For unicast or groupcast, each RX UE sends ACK/NACK on PSFCH upon receiving each transmission, wherein there are two feedback options for groupcast: (i) NACK only; and (ii) ACK and NACK.

At procedure 504 of procedure flow 500, UE 115i (e.g., sidelink TX UE) forwards the sidelink feedback provided by UE 115j (e.g., sidelink RX UE) to base station 105e. In particular, UE 115i forwards the ACK/NACK received from UE 115j to base station 105e on PUCCH. The feedback may, for example, be used for requesting resources for retransmission of data to one or more sidelink RX UE.

Figure 6A:
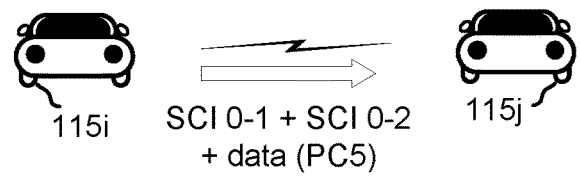
FIGS. 6A and 6B show an example of sidelink resource grants in accordance with V2X transmission mode 2 according to some embodiments of the present disclosure.

A UE (e.g., UE 115i) determines sidelink resources to be used by the UE for sidelink transmissions via a PC5 connection to another UE (e.g., UE 115j) in V2X transmission mode 2 (Mode 2), as illustrated in FIG. 6A. The sidelink resources used for the sidelink transmission may be selected by a sidelink TX UE (e.g., UE 115i) from sidelink resources configured by the network (e.g., base station 105e via Type 1 DG or CG or Type 2 CG). Additionally or alternatively, the sidelink resources used for the sidelink transmission may be selected by a sidelink TX UE (e.g., UE 115i) from preconfigured sidelink resources.

Figure 6B:
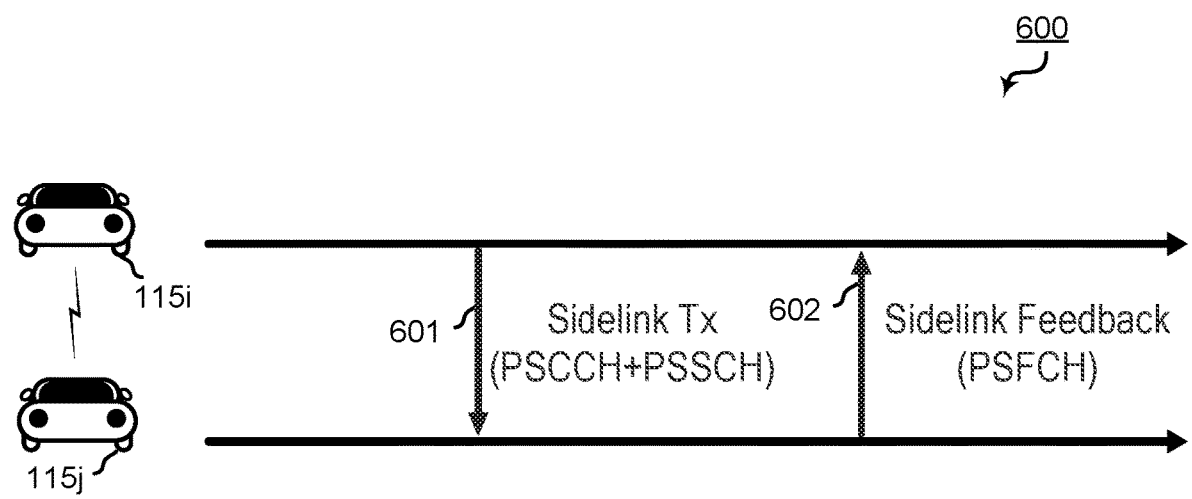

FIG. 6B illustrates a physical-layer procedure flow (procedure flow 600) for Mode 2 using sidelink resources of sidelink resources configured by the network or preconfigured sidelink resources. Procedure flow 600 of FIG. 6B is described with reference to a V2X mesh network between UEs 115i and 115j communicating with macro base station 105e, as shown in wireless network 100 of FIG. 1. It should be understood, however, that the procedure flow may be implemented with respect to various UEs and UE configurations.

In operation according to procedure flow 600 of FIG. 6B, UE 115i (e.g., sidelink TX UE) senses and selects resources for use in providing a sidelink with one or more sidelink RX UEs (e.g., UE 115j). For example, UE 115i may sense and select resources based on all SCI 0-1 messages and the reference signal receive power (RSRP) measurements of a DMRS inside PSSCH or PSCCH.

At procedure 601 of procedure flow 600, UE 115i (e.g., sidelink TX UE) uses SCI, provided according to SCI format 0-1 (e.g., for scheduling physical sidelink shared channel (PSSCH) and second-stage SCI on PSSCH) and SCI format 0-2 (e.g., for decoding PSSCH), to schedule PSSCH and transmit data (e.g., one or more transport block (TB) comprising user data and/or other data) through PSSCH to UE 115j (e.g., sidelink RX UE) using the sidelink resources selected for the sidelink communications. As described above, SCI format 0-1 provides fields for priority, frequency resource assignment, time resource assignment, resource reservation period, DMRS pattern, second-stage SCI format (broadcast, unicast, groupcast), Beta_offset indicator, number of DMRS port, MCS, and a reserved field. SCI format 0-2 provides fields for HARQ process ID, new data indicator, redundancy version, source ID, destination ID, and CSI request, also if the second-stage SCI format field in the corresponding SCI provided in SCI format 0-1 indicates type 1 groupcast zone ID and communication range requirement fields are present.

At procedure 602 of procedure flow 600 of FIG. 6B, UE 115j (e.g., sidelink RX UE) provides sidelink feedback to UE 115i (e.g., sidelink TX UE). As noted above, three transmission types are specified in SCI 0-1: unicast; broadcast; and groupcast. For unicast or groupcast, each RX UE sends ACK/NACK on PSFCH upon receiving each transmission, wherein there are two feedback options for groupcast: (i) NACK only; and (ii) ACK and NACK.

Figure 7:
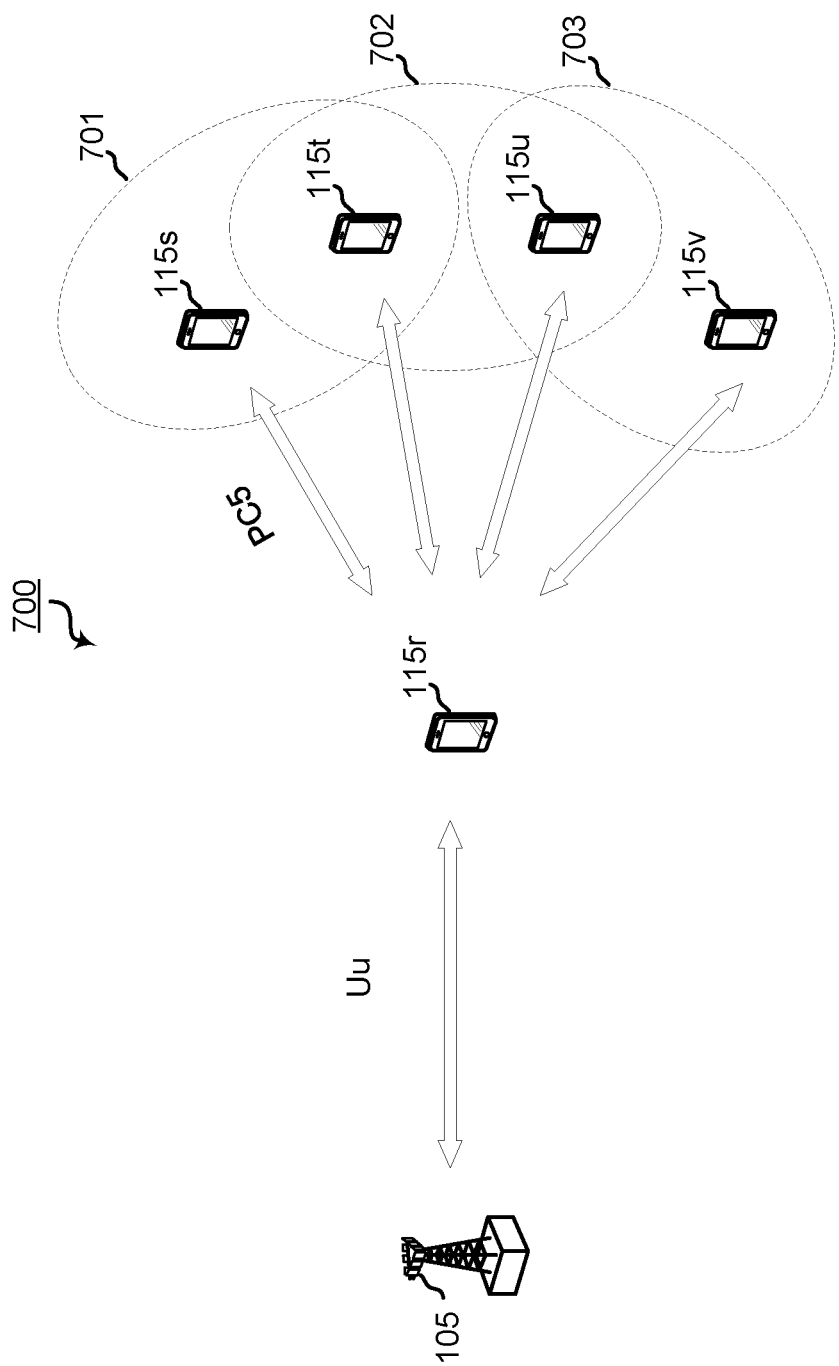
FIG. 7 is an example CPE communication configuration according to some embodiments of the present disclosure.

FIG. 7 illustrates CPE communication configuration 700 in which an intermediate node (e.g., UE 115r) is operable to transmit groupcast messages to one or more groups of UEs (e.g., UEs 115s, 115t, 115u, and 115v comprising groups 701, 702, and 703) in a periodic manner. It should be appreciated that the particular groupings of UEs and the UEs included in the respective groups are illustrative and may not precisely correspond to a configuration of any particular implementation. For example, the number of UEs in a group, the number of groups, the inclusion of UEs in more than one group, etc. may be different than shown in the example of CPE communication configuration 700 according to some aspects of the disclosure.

In example CPE communication configuration 700 of FIG. 7, base station 105 and UEs 115r-115v may comprise various configurations, such as any of the configurations discussed above with reference to FIG. 1. UE 115r operating as an intermediate UE providing sidelinks with respect to UEs 115s-115v may, for example, comprise a smartphone, set-top box, wireless router or other access point, etc. providing periodic groupcast message transmission to some or all of UEs 115s-115v. The periodic messages being groupcast may, as an example, originate from video/voice streaming applications. Multiple groupcasts may exist simultaneously, such as to implement groupcasting of different video/voice streams to the UEs of each of groups 701, 702, and 703.

Semi-persistent scheduling (SPS) is implemented according to aspects of the present disclosure to facilitate the transmission of periodic messages via one or more sidelinks (e.g., the sidelinks of CPE communication configuration 700). Existing V2X protocols do not, however, support SPS for sidelink groupcast. Instead, current PC5 interface protocols require a sidelink TX UE of a group of sidelinks to groupcast SCI format 0-1 and SCI format 0-2 messages with the periodic PSSCH data, even when the SCI format 0-1 and SCI format 0-2 messages remain the same.

In implementing SPS for sidelink groupcast according to some aspects of the present disclosure a sidelink TX UE (e.g., UE 115r of CPE communication configuration 700) may transmit group SPS activation/deactivation to a group of sidelink RX UEs (e.g., UEs 115s and 115t of group 701, UEs 115t and 115u of group 702, or UEs 115u and 115v of group 703), such as through SCI format 0-1 and SCI format 0-2 messages transmitted with the first PSSCH data of a sidelink groupcast. After activation, the sidelink TX UE (e.g., UE 115r operating in V2X Mode 1) may omit transmission of both SCI format 0-1 and SCI format 0-2 messages with respect to subsequently transmitted PSSCH data of the sidelink groupcast. As another example, after activation, the sidelink TX UE (e.g., UE 115r operating in V2X Mode 2) may transmit SCI format 0-1 messages and omit transmission of SCI format 0-2 messages with respect to subsequently transmitted PSSCH data of the sidelink groupcast (e.g., continued transmission of SCI format 0-1 messages may be utilized by the sidelink TX UE to maintain existing resource sensing procedures for Mode 2 operation). In both of the foregoing examples, control overhead is reduced with respect to the sidelink groupcasts. Such reduced control overhead may provide improved reliability with respect to the periodic sidelink groupcast data, such as through freeing bandwidth of the sidelink resources for more robust PSSCH data transmission.

Figures 8, 9:
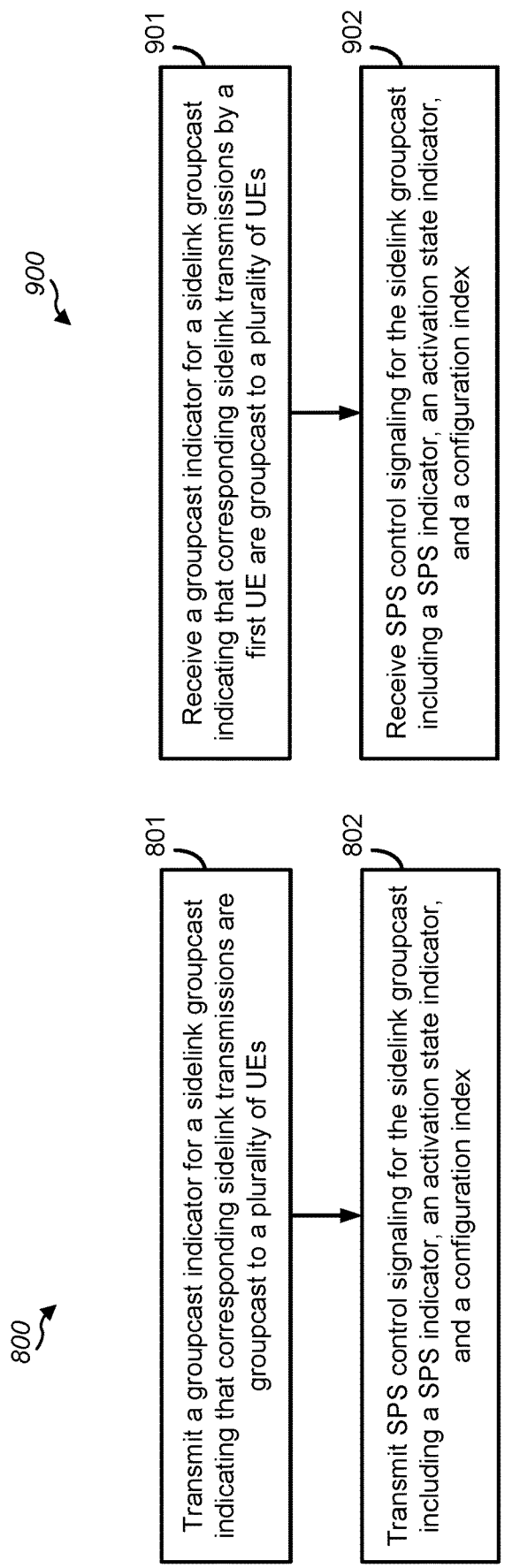
FIGS. 8 and 9 are example flow diagrams of operation for semi-persistent scheduling (SPS) for sidelink groupcast according to some embodiments of the present disclosure.

FIGS. 8 and 9 show example flow diagrams of operation for SPS for sidelink groupcast according to some aspects of the present disclosure. In particular, FIG. 8 shows flow 800 providing operation as may be implemented by a sidelink TX UE (e.g., UE 115r of CPE communication configuration 700) for facilitating SPS for sidelink groupcast. Correspondingly, FIG. 9 shows flow 900 providing operation as may be implemented by a sidelink RX UE (e.g., any or all of UEs 115s-115v of CPE communication configuration 700) for facilitating SPS for sidelink groupcast.

Referring first to FIG. 8, a sidelink TX UE may transmit group SPS activation/deactivation to a group of sidelink RX UEs in facilitating SPS sidelink groupcast. In accordance with some aspects of the disclosure, group SPS activation/deactivation for a sidelink groupcast may be transmitted to a group of sidelink RX UEs through SCI format 0-1 and SCI format 0-2 messages (e.g., SCI format 0-1 and SCI format 0-2 messages transmitted with the first PSSCH data of a sidelink groupcast).

According to the example of flow 800 shown in FIG. 8, a first UE (e.g., UE 115r of CPE communication configuration 700) may transmit a groupcast indicator indicating that corresponding sidelink transmissions are groupcast to a plurality of UEs (e.g., UEs 115s and 115t of group 701, UEs 115t and 115u of group 702, or UEs 115u and 115v of group 703) at block 801. For example, wireless communication resources (e.g., one or more wireless radios, such as may comprise transmit processor 264, TX MIMO processor 266, and MODs/DEMODs 254a through 254r, operating under control of one or more controller/processors, such as controller/processor 280 executing SPS sidelink groupcast logic) of a sidelink TX UE (e.g., UE 115r) may be utilized to transmit a groupcast indicator for a sidelink groupcast in accordance with aspects of the present disclosure. A groupcast indicator of the present disclosure may be transmitted at least in part via a field of a SCI format 0-1 message or a field of a SCI format 0-2 message. A groupcast indicator may, for example, be transmitted to a group of sidelink RX UEs at least in part via a SCI format 0-1 message (e.g., using a "SCI 0-2 Format" field of a SCI format 0-1 message to indicate that the sidelink transmission is "groupcast").

A TX UE which has been granted resources by a corresponding base station, or otherwise has preconfigured sidelink resources, may activate and/or deactivate SPS for the sidelink groupcast using SPS control signaling for the sidelink groupcast for any given combination of SCI 0-1 and SCI 0-2 that can be used for sidelink groupcast. In accordance with some aspects of the disclosure, SPS control signaling utilized for activating/deactivating SPS for a sidelink groupcast may include a SPS indicator (e.g., conveyed at least in part via SCI format 0-1 message), an activation/deactivation indicator (e.g., conveyed at least in part via SCI format 0-1 message and/or SCI format 0-2 message), and a configuration index (e.g., conveyed at least in part via one or more fields of a SCI format 0-1 message and/or SCI format 0-2 message). In the example of flow 800, a first UE (e.g., UE 115r of CPE communication configuration 700) may transmit SPS control signaling for the sidelink groupcast including a SPS indicator, an activation state indicator, and a configuration index at block 802. For example, wireless communication resources (e.g., one or more wireless radios, such as may comprise transmit processor 264, TX MIMO processor 266, and MODs/DEMODs 254a through 254r, operating under control of one or more controller/processors, such as controller/processor 280 executing SPS sidelink groupcast logic) of a sidelink TX UE (e.g., UE 115r) may be utilized to transmit SPS control signaling for a sidelink groupcast in accordance with aspects of the present disclosure.

A SPS indicator of SPS control signaling utilized for activating/deactivating SPS for a sidelink groupcast according to aspects of the disclosure may be conveyed using a SCI format 0-1 message (e.g., transmitted at least in part via one or more fields of a SCI format 0-1 message). In some examples, a CRC included in a field of the SCI format 0-1 message may be scrambled using a SPS RNTI for providing the SPS indicator. Additionally or alternatively, a field of a SCI message may be defined for providing the SPS indicator.

In accordance with some aspects of the present disclosure, the SPS RNTI used for providing a SPS indicator may comprise a common sidelink SPS RNTI (SL-SPS-RNTI) common to all UEs (e.g., all of UEs 115s-115v, regardless of the group of UEs for the sidelink groupcast) in sidelink communication with the first UE (e.g., UE 115r). For example, a SPS indicator may be transmitted at least in part by scrambling a CRC of a SCI format 0-1 message with a common SL-SPS-RNTI which is common to all UEs in sidelink communication with the first UE. In an implementation where the CRC is scrambled with a common SL-SPS-RNTI, any decoding UE may understand that this SCI format 0-1 message and the subsequent SCI format 0-2 message contain group SPS information. Accordingly, the common SL-SPS-RNTI may indicate that the SCI format 0-1 message and a corresponding SCI format 0-2 message contain SPS information for the sidelink groupcast.

The SPS RNTI used for providing a SPS indicator may comprise a sidelink SPS group-specific RNTI (SL-SPS-group-RNTI) for a group of groupcast RX UEs (e.g., UEs 115s and 115t, UEs 115t and 115u, or UEs 115u and 115v of a particular one of groups 701, 702, or 703 for the sidelink groupcast), in accordance with some aspects of the present disclosure. A SL-SPS-group-RNTI used to scramble the CRC of a SCI format 0-1 message may thus indicate SPS for a specific group of RX UEs. According to some examples, a groupcast indicator and a SPS indicator may be jointly transmitted at least in part by scrambling a CRC of a SCI format 0-1 message with a SL-SPS-group-RNTI for a group of groupcast receiver UEs consisting of the plurality of UEs. In accordance with some aspects of the disclosure, if the indicated group coincides with the group indicated in SCI format 0-2 message, the 12-bit destination group IDs and 4-bit zone IDs in the corresponding SCI format 0-2 message may be made available for other purpose (e.g., carrying other information). Accordingly, message destination group IDs and/or zone IDs in a SCI format 0-2 message corresponding to the SCI format 0-1 message are made available for purposes other than destination group IDs and zone IDs when a group indicated by the SL-SPS-group-RNTI coincides with a group indicated in the corresponding SCI format 0-2 message, according to some aspects of the present disclosure. Such operation may save a significant amount of resources, such as compared to the use of a common SL-SPS-RNTI, when the number of groups is small (e.g., the number of groups is below 10).

In accordance with some aspects of the present disclosure, an extra field may be added inside of the SCI format 0-1 (e.g., a 1-bit SPS indicator field) to indicate the presence of group SPS information in the SCI format 0-1 message and/or corresponding SCI format 0-2 message. Accordingly, a field of the SCI format 0-1 message defined for indicating the presence of SPS information in the SCI format 0-1 message and a corresponding SCI format 0-2 message may provide a SPS indicator of SPS control signaling.

An activation state indicator of SPS control signaling utilized for activating/deactivating SPS for a sidelink groupcast according to aspects of the disclosure may be conveyed using a SCI format 0-1 message and/or SCI format 0-2 message. The activation state indicator may, for example, indicate either activation of the SPS of the sidelink groupcast or deactivation of the SPS of the sidelink groupcast. In some examples, a combination of fields of a SCI format 0-1 message and/or SCI format 0-2 message may be used for providing the activation state indicator. Additionally or alternatively, a field of a SCI message may be defined for providing the activation state indicator.

In accordance with some aspects of the present disclosure, the activation state indicator is transmitted at least in part via one or more fields of a SCI format 0-1 message, one or more fields of a SCI format 0-2 message, or a combination thereof. For example, a combination of contents of at least one field of the SCI format 0-1 message and at least one field of the SCI format 0-2 message may provide an activation state indicator of SPS control signaling. The contents of a field of the SCI format 0-1 message (e.g., one or more bits designating group SPS) may indicate group SPS and the contents of a field of the SCI format 0-2 message may indicate new data, wherein the combination of these indicators provides an activation state indicator. By way of example, an activation state indicator may indicate activation of the SPS of the sidelink groupcast when the contents of a field of the SCI format 0-1 message indicates group SPS, the contents of a field of the SCI format 0-2 message includes a predetermined new data field value (e.g., a new data field value of 0), and frequency and time resource assignments for the sidelink groupcast are feasible (e.g., valid values, available for implementing by the UEs, etc.). Similarly, an activation state indicator may indicate deactivation of the SPS of the sidelink groupcast when the contents of a field of the SCI format 0-1 message indicate group SPS, the contents of a field of the SCI format 0-2 message includes a predetermined new data field value (e.g., a new data field value of 0), and frequency and time resource assignments for the sidelink groupcast are not feasible (e.g., invalid values, such as all set to all 0s, unavailable for implementing by the UEs, etc.).

An extra field may be added inside of the SCI format 0-1 and/or SCI format 0-2 (e.g., a 1-bit activation state indicator field) to indicate activation/deactivation of the SPS for sidelink groupcast, according to some aspects of the present disclosure. Accordingly, a field of the SCI format 0-1 message and/or a field of the SCI format 0-2 message defined for indicating an activation state of the SPS of the sidelink groupcast may provide an activation state indicator of SPS control signaling.

A configuration index of SPS control signaling utilized for activating/deactivating SPS for a sidelink groupcast according to aspects of the disclosure may be conveyed using a SCI format 0-1 message and/or a SCI format 0-2 message. In some examples, one or a combination of fields of a SCI format 0-1 message and/or SCI format 0-2 message may be used for providing the configuration index. A configuration index may, for example, be transmitted at least in part via a field of a SCI format 0-1 message or a SCI format 0-2 message indicating a group SPS. Additionally or alternatively, a field of a SCI message may be defined for providing the configuration index.

In accordance with some aspects of the disclosure, a combination of contents provide a configuration index of the SPS for sidelink groupcast. For example, a combination of contents of a field of a SCI format 0-1 message (e.g., contents indicating group SPS) and some bits of a HARQ process ID field (e.g., SCI format 0-2 HARQ process ID field) may provide a configuration index according to aspects of the disclosure. Accordingly, in a situation where the SCI format 0-1 message indicates group SPS, one or more bits of a HARQ process ID within the HARQ process ID field of a corresponding SCI format 0-2 message may specify an index value of the configuration index.

An extra field may be added inside of the SCI format 0-1 and/or SCI format 0-2 (e.g., a configuration index field, such as may comprise 1, 2, 3, etc. bits depending upon a number of configurations indexed) to indicate a configuration index of the SPS for sidelink groupcast, according to some aspects of the present disclosure. Accordingly, a field of the SCI format 0-1 message and/or a field of the SCI format 0-2 message defined for indicating a configuration index of the SPS of the sidelink groupcast may provide a configuration index of SPS control signaling.

In accordance with some aspects of the disclosure, the configuration index may provide an index to one or more parameters of a set of parameters for the SPS sidelink groupcast. For example, a configuration index may correspond to a database of various SPS sidelink groupcast configuration parameters (e.g., stored by some or all of UEs 115r-115v), wherein each configuration may include parameters such as one or more of a SPS RNTI, a periodicity of the sidelink groupcast, and/or a maximum number of times that a TB for the sidelink groupcast can be transmitted. According to some aspects, SPS sidelink groupcast configurations may be preconfigured (e.g., by the TX UE, a base station, etc.), whereby a SPS sidelink groupcast configuration for a particular groupcast may be selected and/or agreed upon between a TX UE and the group of RX UEs using a configuration index. Accordingly, a configuration index according to aspects of the disclosure may identify the group SPS configuration for a SPS sidelink groupcast, such as may provide parameters such as SL-SPS-RNTI or SL-SPS-group-RNTI (e.g., for activation, deactivation, and retransmission), periodicity of group SPS, the maximum number of times that a TB can be transmitted using the configured grant, etc. In accordance with some examples, a groupcast indicator, a SPS indicator, and a configuration index together indicate a set of parameters associated with the SPS for the sidelink groupcast (e.g., one or more parameters, such as a periodicity of the sidelink groupcast or a maximum number of times that a TB for the sidelink groupcast can be transmitted, etc.).

In addition to the functions expressly shown in the blocks of example flow 800 shown in FIG. 8, operation for SPS for sidelink groupcast according to some aspects of the present disclosure may comprise further TX UE actions with respect to SPS sidelink groupcast activation and/or deactivation. For example, activation of a SPS sidelink groupcast (e.g., resources for which may be provided by received CGs) may be performed by transmitting a SPS sidelink groupcast activation indication, and thereafter determining whether activation is to be considered complete or incomplete.

As described above, a TX UE may transmit a groupcast indicator and SPS control signaling, such as by transmitting a SCI format 0-1 message and corresponding SCI format 0-2 message, followed by PSSCH groupcast data, wherein the two SCIs are configured to indicate group SPS activation and SPS configuration. Accordingly, a first UE (e.g., UE 115r of CPE communication configuration 700) may transmit a first SCI format 0-1 message for the sidelink groupcast, transmit a first SCI format 0-2 message for the sidelink groupcast (e.g., SPS control signaling for the sidelink groupcast may be included in the SCI format 0-1 message, the SCI format 0-2 message, or a combination thereof), and transmit PSSCH groupcast data for the sidelink groupcast.

In accordance with aspects of the disclosure, SPS configuration activation may be considered complete if the TX UE has received at least one feedback message from every RX UE in the target group (e.g., feedback on PSFCH). Accordingly, a first UE (e.g., UE 115r) may monitor for a feedback message from each UE of a plurality of UEs of a SPS sidelink groupcast group, and determine (e.g., using controller/processor 280 executing SPS sidelink groupcast logic) that activation of the SPS of the sidelink groupcast is complete if the feedback message has been received from each UE of the plurality of UEs.

After completion of SPS configuration activation, the subsequent PSSCH may not be accompanied by repetitive SCI format 0-1 and SCI format 0-2 messages according to some aspects of the present disclosure. For example, subsequent PSSCH groupcast data transmissions for the sidelink groupcast may be unaccompanied by a SCI format 0-1 message, a SCI format 0-2 message, or both when it is determined that activation of the SPS of the sidelink groupcast is complete. For example, when an activation state indicator indicates activation of the SPS of the sidelink groupcast, subsequent PSSCH groupcast data transmissions for the sidelink groupcast may be accompanied by no SCI or only a SCI format 0-1 message when a feedback message has been received from each UE of the plurality of UEs and activation of the SPS of the sidelink groupcast is complete. In an example where the TX UE is operating in V2X Mode 1 (e.g., sidelink resources for the sidelink groupcast are scheduled by a base station in communication with the TX UE), the TX UE may determine (e.g., using controller/processor 280 executing SPS sidelink groupcast logic) that SCI format 0-1 message contents and SCI format 0-2 message contents associated with an instance of the subsequent PSSCH groupcast data transmission are identical to contents of a respective one of the first SCI format 0-1 message and the first SCI format 0-2 message, and transmit the subsequent PSSCH groupcast data transmission for the sidelink groupcast unaccompanied by an instance of a SCI format 0-1 message and an instance of a SCI format 0-2 message. In an example where the TX UE is operating in V2X Mode 2 (e.g., sidelink resources for the sidelink groupcast are scheduled by the TX UE), the TX UE may determine (e.g., using controller/processor 280 executing SPS sidelink groupcast logic) that SCI format 0-1 message contents and SCI format 0-2 message contents associated with an instance of the subsequent PSSCH groupcast data transmission are identical to contents of a respective one of the first SCI format 0-1 message and the first SCI format 0-2 message, and transmit the subsequent PSSCH groupcast data transmission for the sidelink groupcast accompanied by an instance of a SCI format 0-1 message and unaccompanied by an instance of a SCI format 0-2 message.

SPS configuration activation may be considered incomplete if the TX UE has not received a feedback message from every RX UE in the target group (e.g., feedback on PSFCH). Accordingly, a first UE (e.g., UE 115r) may monitor for a feedback message from each UE of a plurality of UEs of a SPS sidelink groupcast group, and determine (e.g., using controller/processor 280 executing SPS sidelink groupcast logic) that activation of the SPS of the sidelink groupcast is incomplete if the feedback message has not been received from each UE of the plurality of UEs. When the activation is considered incomplete, subsequent PSSCH groupcast data transmissions for the sidelink groupcast may be accompanied by the first SCI format 0-1 message and the second SCI format 0-2 message. For example, subsequent PSSCH data transmitted according to the SPS sidelink groupcast may be preceded by the same SCI format 0-1 message and SCI format 0-2 message, to indicate the same SPS activation (e.g., until activation of the SPS configuration is considered complete, such as by appropriate feedback messages being received from all UEs of the target group).

Deactivation of a SPS sidelink groupcast may be performed using functionality similar to that for activation of a SPS sidelink groupcast described above. For example, SPS control signaling similar to that of SPS sidelink groupcast activation, except having different contents for the activation state indicator, may be utilized for deactivation of a SPS sidelink groupcast. In accordance with some aspects of the invention, a first UE (e.g., UE 115r) may transmit a second SCI format 0-1 message for the sidelink groupcast and transmit a second SCI format 0-2 message for the sidelink groupcast, wherein the second SCI format 0-1 message, the second SCI format 0-2 message, or a combination thereof provide an activation state indicator indicating deactivation of the SPS of the sidelink groupcast.

Additionally or alternatively, reactivation of a deactivated SPS sidelink groupcast and/or updating of a SPS configuration for a SPS sidelink groupcast may be performed using functionality similar to that for activation of a SPS sidelink groupcast described above. For example, SPS control signaling similar to that of SPS sidelink groupcast activation, except having updated SCI format 0-1 and/or updated SCI format 0-2 message, may be utilized for reactivation and/or updating of a SPS sidelink groupcast. For example, a TX UE changing the MCS used for a sidelink groupcast may transmit a SCI format 0-1 message and corresponding SCI format 0-2 message (e.g., configured to indicate group SPS activation and SPS configuration) with an updated MCS field (e.g., as if activating the same SPS configuration). In accordance with some aspects of the disclosure, a first UE (e.g., UE 115r) may transmit a second SCI format 0-1 message for the sidelink groupcast, transmit a second SCI format 0-2 message for the sidelink groupcast (e.g., the second SCI format 0-1 message, the second SCI format 0-2 message, or both may include updated contents with respect to the first SCI format 0-1 message, the first SPS format 0-2 message, or both, and the activation state indicator may indicate activation of the SPS of the sidelink groupcast) for reactivating or updating a SPS sidelink groupcast using a different SPS configuration.

Having described example operation of a sidelink TX UE, reference is now made to FIG. 9 for example operation of a sidelink RX UE in facilitating SPS sidelink groupcast. A sidelink RX UE may receive group SPS activation/deactivation for a target group of sidelink RX UEs transmitted by a sidelink TX UE in facilitating SPS sidelink groupcast. In accordance with some aspects of the disclosure, group SPS activation/deactivation for a sidelink groupcast may be received at least in part via SCI format 0-1 and SCI format 0-2 messages (e.g., SCI format 0-1 and SCI format 0-2 messages received with the first PSSCH data of a sidelink groupcast).

According to the example of flow 900 shown in FIG. 9, a UE of a plurality of UEs (e.g., a UE of UEs 115s-115v of a target group of groups 701-703 of CPE communication configuration 700) in communication with a first UE (e.g., UE 115r) may receive a groupcast indicator indicating that corresponding sidelink transmissions are groupcast to a plurality of UEs (e.g., UEs 115s and 115t of group 701, UEs 115t and 115u of group 702, or UEs 115u and 115v of group 703) at block 901. For example, wireless communication resources (e.g., one or more wireless radios, such as may comprise MODs/DEMODs 254a through 254r, MIMO detector 256, and receive processor 258, operating under control of one or more controller/processors, such as controller/processor 280 executing SPS sidelink groupcast logic) of a sidelink RX UE (e.g., a UE of UEs 115s-115v) may be utilized to receive a groupcast indicator for a sidelink groupcast in accordance with aspects of the present disclosure. A groupcast indicator of the present disclosure may be received at least in part via a field of a SCI format 0-1 message or a field of a SCI format 0-2 message A groupcast indicator may, for example, be received by a UE of a group of sidelink RX UEs at least in part via a SCI format 0-1 message (e.g., a "SCI 0-2 Format" field of a SCI format 0-1 message indicating that the sidelink transmission is "groupcast").

SPS for the sidelink groupcast may be activated/deactivated using SPS control signaling for the sidelink groupcast for any given combination of SCI 0-1 and SCI 0-2 that can be used for sidelink groupcast. In accordance with some aspects of the disclosure, SPS control signaling utilized for activating/deactivating SPS for a sidelink groupcast may include a SPS indicator (e.g., conveyed at least in part via SCI format 0-1 message), an activation/deactivation indicator (e.g., conveyed at least in part via one or more fields of a SCI format 0-1 message and/or SCI format 0-2 message), and a configuration index (e.g., conveyed at least in part via SCI format 0-1 message and/or SCI format 0-2 message). In the example of flow 900, a UE of a plurality of UEs (e.g., a UE of UEs 115s-115v of a target group of groups 701-703 of CPE communication configuration 700) in communication with a first UE (e.g., UE 115r) may receive SPS control signaling for the sidelink groupcast including a SPS indicator, an activation state indicator, and a configuration index at block 902. For example, wireless communication resources (e.g., one or more wireless radios, such as may comprise MODs/DEMODs 254a through 254r, MIMO detector 256, and receive processor 258, operating under control of one or more controller/processors, such as controller/processor 280 executing SPS sidelink groupcast logic) of a sidelink RX UE (e.g., a UE of UEs 115s-115v) may be utilized to receive SPS control signaling for a sidelink groupcast in accordance with aspects of the present disclosure.

In accordance with some aspects of the disclosure, a SPS indicator may be received at least in part via one or more fields of a SCI format 0-1 message. For example, a CRC included in a field of the SCI format 0-1 message may be scrambled using a SPS RNTI (e.g., a SPS RNTI of a SPS configuration indicated by a configuration index for the SPS sidelink groupcast) to provide the SPS indicator. In an example, the SPS RNTI may be a common SL-SPS-RNTI common to all UEs (e.g., all of UEs 115s-115v, regardless of the group of UEs for the sidelink groupcast) in sidelink communication with the first UE (e.g., UE 115r). For example, a SPS indicator may be received at least in part by a CRC of a SCI format 0-1 message scrambled with a common SL-SPS-RNTI which is common to all UEs in sidelink communication with the first UE. The common SL-SPS-RNTI may indicate that the SCI format 0-1 message and a corresponding SCI format 0-2 message contain SPS information for the sidelink groupcast. In another example, the SPS RNTI may be a SL-SPS-group-RNTI for a group of groupcast RX UEs (e.g., UEs 115s and 115t, UEs 115t and 115u, or UEs 115u and 115v of a particular one of groups 701, 702, or 703 for the sidelink groupcast). According to some examples, a groupcast indicator and a SPS indicator may be jointly received at least in part by a CRC of a SCI format 0-1 message scrambled with a SL-SPS-group-RNTI for a group of groupcast receiver UEs consisting of the plurality of UEs. Additionally or alternatively, an extra field may be added inside of the SCI format 0-1 (e.g., a 1-bit SPS indicator field) to indicate the presence of group SPS information in the SCI format 0-1 message and/or corresponding SCI format 0-2 message. Accordingly, a field of the SCI format 0-1 message defined for indicating the presence of SPS information in the SCI format 0-1 message and a corresponding SCI format 0-2 message may provide a SPS indicator of SPS control signaling.

An activation state indicator indicates either activation of the SPS of the sidelink groupcast or deactivation of the SPS of the sidelink groupcast according to some aspects of the present disclosure. An activation state indicator may, for example, be received at least in part via one or more fields of a SCI format 0-1 message, one or more fields of a SCI format 0-2 message, or a combination thereof. In an example, a combination of contents of a field of a SCI format 0-1 message (e.g., SCI format 0-1 message contents indicating group SPS) and a field of a SCI format 0-2 message (e.g., SCI format 0-2 message contents comprising a new data indicator) provides an activation state indicator. Additionally or alternatively, a field of the SCI format 0-1 message or a field of the SCI format 0-2 message may be defined for indicating an activation state of the SPS of the sidelink groupcast, and thus be used for providing an activation state indicator.

In accordance with some aspects of the disclosure, a configuration index may be received at least in part via one or more fields of a SCI format 0-1 message, one or more fields of a SCI format 0-2 message, or a combination thereof. A configuration index may, for example, be received at least in part via a field of a SCI format 0-1 message or a SCI format 0-2 message indicating a group SPS. A configuration index may, for example, be received at least in part via a combination of contents of a SCI format 0-1 message (e.g., SCI format 0-1 message contents indicating group SPS) and some bits of a HARQ process ID field (e.g., SCI format 0-2 HARQ process ID field). Accordingly, in a situation where the SCI format 0-1 message indicates group SPS, one or more bits of a HARQ process ID within the HARQ process ID field of a corresponding SCI format 0-2 message may specify an index value of the configuration index. Additionally or alternatively, a field of the SCI format 0-1 message or a field of the SCI format 0-2 message may be defined for indicating an index value of the configuration index, and thus may be used for providing the configuration index.

A configuration index may provide an index to one or more parameters of a set of parameters including one or more of a SPS RNTI, a periodicity of the sidelink groupcast, and/or a maximum number of times that a TB for the sidelink groupcast can be transmitted. For example, a configuration index may correspond to a database of various SPS sidelink groupcast configuration parameters (e.g., stored by some or all of UEs 115r-115v), wherein each configuration may include parameters such as one or more of a SPS RNTI, a periodicity of the sidelink groupcast, and/or a maximum number of times that a TB for the sidelink groupcast can be transmitted. In accordance with some examples, a groupcast indicator, a SPS indicator, and a configuration index together indicate a set of parameters associated with the SPS for the sidelink groupcast (e.g., one or more parameters, such as a periodicity of the sidelink groupcast or a maximum number of times that a TB for the sidelink groupcast can be transmitted, etc.).

In addition to the functions expressly shown in the blocks of example flow 900 shown in FIG. 9, operation for SPS for sidelink groupcast according to some aspects of the present disclosure may comprise further RX UE actions with respect to SPS sidelink groupcast activation and/or deactivation. For example, UEs may monitor every SCI format 0-1 message and corresponding SCI format 0-2 message and analyze (e.g., using controller/processor 280 executing SPS sidelink groupcast logic) the SCI messages for an indication of SPS sidelink groupcast. If a SCI format 0-1 message and corresponding SCI format 0-2 message indicate group SPS activation/deactivation and a group destination ID (e.g., destination group identifier of a SCI format 0-2 message, SL-SPS-group-RNTI, etc.) indicates that the UE is a RX UE of a target group for a SPS sidelink groupcast, the UE may carry out various operations for activation and/or operation of a SPS sidelink groupcast.

In accordance with some aspects of the disclosure, if a received SCI format 0-1 message and corresponding SCI format 0-2 message pair are determined to indicate SPS configuration deactivation, a sidelink RX UE may cancel periodic procedures of the SPS configuration and cease periodic monitoring of the respective PSSCH channel. However, if a received SCI format 0-1 message and corresponding SCI format 0-2 message pair are determined to indicate SPS configuration activation, a sidelink RX UE may store the SPS configuration and the two SCIs. For example, if the configuration index indicates that the SPS configuration activation is new, the periodic SPS procedures may be added to any existing ones stored by the sidelink RX UE. If the configuration index indicates that the SPS configuration activation is a reactivation or update of an existing SPS configuration, corresponding existing periodic SPS procedures may be updated by the sidelink RX UE. Further, the sidelink RX UE may decode the corresponding PSSCH data.

A sidelink RX UE operating according to a SPS configuration of a SPS for sidelink groupcast may receive and decode data from the PSSCH channel and send ACK/NACK on PSFCH periodically according to the stored SPS configuration and SCIs. A NACK only option and an ACK and NACK option for feedback on PSFCH are provided for in current V2X interface protocols. For any PSSCH data with SCIs (e.g., SCI format 0-1 message and/or SCI format 0-2 message), a sidelink RX UE of a SPS sidelink groupcast according to some aspects of the disclosure implements ACK and NACK for feedback on PSFCH in case activation/reactivation is incomplete. Accordingly, a sidelink RX UE may operate to send an ACK/NACK on PSFCH irrespective of a NACK only option for PSSCH groupcast data decoding. Where a NACK-only option is used, a SPS configuration activation process completion determination according to some aspects of the disclosure may nevertheless be facilitated (e.g., a SPS configuration activation process may otherwise be determined not to have completed if every data is received correctly).

In operation of a SPS sidelink groupcast of some aspects of the disclosure, a sidelink RX UE may continue to receive and decode data from the PSSCH channel which is unaccompanied by a corresponding SCI format 0-1 message and/or SCI format 0-2 message. For example, if no pair of SCI format 0-1 message and SCI format 0-2 message is received containing group SPS information regarding a stored SPS configuration, the stored SPS configuration and SCIs remains valid and sidelink RX UE continues to receive data from the corresponding PSSCH periodically.

SPS sidelink groupcast implemented according to some aspects of the present disclosure provides for robust and resilient delivery of groupcast data. Accordingly, techniques for retransmission of groupcast data may be implemented by sidelink TX UEs and/or sidelink RX UEs. A sidelink TX UE may determine (e.g., using controller/processor 280 executing SPS sidelink groupcast logic) that groupcast data (e.g., data of a previously transmitted TB) is to be retransmitted based upon various considerations.

A sidelink TX UE may, for example, retransmit groupcast data in response to receiving a NACK (e.g., via PSFCH) from a sidelink RX UE of a SPS sidelink groupcast group. In accordance with some aspects of the disclosure, a first UE (e.g., UE 115r of CPE communication configuration 700) may determine to retransmit a groupcast TB for the sidelink groupcast based on receiving a NACK for a PSSCH groupcast data transmission for the sidelink groupcast from a sidelink RX UE of a SPS sidelink groupcast (e.g., a UE of UEs 115s-115v of a target group of groups 701-703). Such a retransmission technique may be utilized with respect to both a NACK only option and an ACK and NACK option for feedback.

As another example, a sidelink TX UE may retransmit groupcast data in response to not having received an ACK (e.g., via PSFCH) from any sidelink RX UE of a SPS sidelink groupcast group. In accordance with some aspects of the disclosure, a first UE (e.g., UE 115r) may determine to retransmit a groupcast TB for the sidelink groupcast based on failing to receive an ACK for a PSSCH groupcast data transmission for the sidelink groupcast from a sidelink RX UE of a SPS sidelink groupcast (e.g., a UE of UEs 115s-115v of a target group of groups 701-703). Such a retransmission technique may be utilized with respect to an ACK and NACK option for feedback.

A sidelink TX UE may allocate resources for retransmission of SPS sidelink groupcast data in accordance with aspects of the disclosure. For example, in providing dynamic retransmission of SPS sidelink groupcast data, a sidelink TX UE may allocate resources for retransmission of SPS sidelink groupcast data with the same HARQ ID as the original transmission of the data (e.g., as if the retransmission is carrying new data). Accordingly, in accordance with some aspects of the disclosure, a first UE (e.g., UE 115r) may allocate resources for retransmission of a groupcast TB for the sidelink groupcast, and retransmit the groupcast TB using a same HARQ process ID as used for original transmission of the groupcast TB. Both a SCI format 0-1 message and SCI format 0-2 message (e.g., carrying the SPS indicator, configuration index, etc.) accompany a retransmission of SPS sidelink groupcast data according to some aspects of the disclosure. A field inside the SCI format 0-1 message and/or SCI format 0-2 message may, for example, indicate that the PSSCH contains retransmitted data. For example, a TX UE may transmit SCI format 0-1 and SCI format 0-2 messages which carry a SPS indicator and configuration index, wherein a new data indicator field may be set to 1 (e.g., to indicate that the SCIs are not for activation/deactivation but for retransmission) and a HARQ process ID field is set to the HARQ process ID of the SPS. Accordingly, retransmitting a TB of a SPS sidelink groupcast may include a first UE (e.g., UE 115r) transmitting a second SCI format 0-1 message for the sidelink groupcast, transmitting a second SCI format 0-2 message for the sidelink groupcast, and retransmitting PSSCH groupcast data for the sidelink groupcast. The second SCI format 0-1 message and/or the second SCI format 0-2 message may carry SPS control signaling (e.g., SPS indicator, configuration index, etc.) for the sidelink groupcast. Additionally or alternatively, the second SCI format 0-1 message, the second SCI format 0-2 message, or both may include one or more fields indicating that the PSSCH groupcast data is retransmitted data for the sidelink groupcast.

Figure 10:
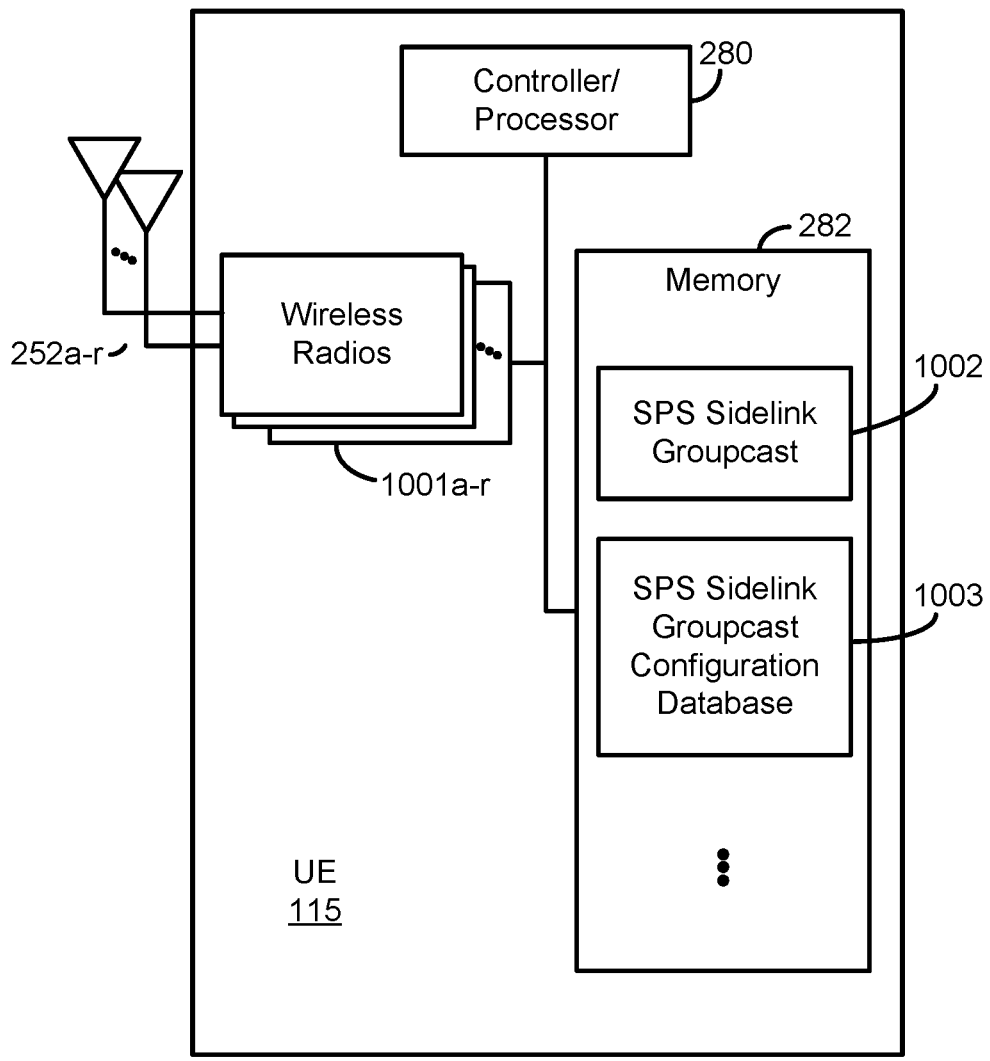
FIG. 10 is a block diagram conceptually illustrating a design of a UE configured for SPS for sidelink groupcast operation according to some embodiments of the present disclosure.

FIG. 10 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 1001a-r and antennas 252a-r. Wireless radios 1001a-r include various components and hardware, as illustrated in FIG. 2 for UE 115, including modulator/demodulators 254a-r, MIMO detector 256, receive processor 258, transmit processor 264, and TX MIMO processor 266.

UE 115 of the example shown in FIG. 10 includes SPS sidelink groupcast logic 1002 and SPS sidelink groupcast configuration parameters database 1003 as may be utilized for performing functions as described herein with respect to a sidelink TX UE and/or sidelink RX UE operable to facilitate SPS for sidelink groupcast. SPS sidelink groupcast logic 1002 may, for example, comprise program code stored in memory 282 that is executed by controller/processor 280 for providing respective functionality. In the context of a sidelink TX UE, SPS sidelink groupcast logic 1002 may provide functionality including controlling transmitting a groupcast indicator for a sidelink groupcast indicating that corresponding sidelink transmissions are groupcast to a plurality of UEs, transmitting SPS control signaling for the sidelink groupcast, transmitting a first SCI format 0-1 message for the sidelink groupcast, transmitting a first SCI format 0-2 message for the sidelink groupcast, transmitting PSSCH groupcast data for the sidelink groupcast, monitoring for a feedback message from each UE of the plurality of UEs, determining that activation of the SPS of the sidelink groupcast is incomplete if a feedback message has not been received from each UE of the plurality of UEs, determining that activation of the SPS of the sidelink groupcast is complete if a feedback message has been received from each UE of the plurality of UEs, transmitting subsequent PSSCH groupcast data transmission for the sidelink groupcast unaccompanied by an instance of a SCI format 0-1 message and an instance of a SCI format 0-2 message, transmitting subsequent PSSCH groupcast data transmission for the sidelink groupcast accompanied by an instance of a SCI format 0-1 message and unaccompanied by an instance of a SCI format 0-2 message, transmitting a second SCI format 0-1 message for the sidelink groupcast, transmitting a second SCI format 0-2 message for the sidelink groupcast, transmitting subsequent PSSCH groupcast data for the sidelink groupcast, determining to retransmit a groupcast TB for the sidelink groupcast, retransmitting a groupcast TB, etc., as may utilize SPS configuration information from SPS sidelink groupcast configuration database 1003, as described above. In the context of a sidelink RX UE, SPS sidelink groupcast logic 1002 may provide functionality including controlling receiving a groupcast indicator for a sidelink groupcast indicating that corresponding sidelink transmissions by a first UE are groupcast to a plurality of UEs, receiving SPS control signaling for the sidelink groupcast, receiving a first SCI format 0-1 message for the sidelink groupcast, receiving a first SCI format 0-2 message for the sidelink groupcast, determining if the first SCI format 0-1 message and the first SCI format 0-2 message correspond to the sidelink transmissions of the sidelink groupcast to the plurality of UEs, analyzing the first SCI format 0-1 message, the first SCI format 0-2 message, or both for the activation state indicator indicating activation of the SPS of the sidelink groupcast or deactivation of the SPS of the sidelink groupcast, decoding PSSCH groupcast data for the sidelink groupcast, transmitting ACKs/NACKs for PSSCH groupcast data, storing configuration parameters for the SPS, determining that SPS of the sidelink groupcast is new or updated based at least in part on a configuration index, etc., as may utilize SPS configuration information from SPS sidelink groupcast configuration database 1003, as described above.

In some examples of methods, apparatuses, and articles described herein, various aspects of SPS for sidelink groupcast techniques may be implemented according to a multiplicity of combinations consistent with concepts described herein. Non-limiting examples of combinations of some aspects of SPS for sidelink groupcast techniques are set forth in the example clauses below.

1. Methods, apparatuses, and articles for wireless communication may provide for transmitting, by a first UE, a groupcast indicator for a sidelink groupcast indicating that corresponding sidelink transmissions are groupcast to a plurality of UEs, and transmitting, by the first UE, SPS control signaling for the sidelink groupcast including a SPS indicator, an activation state indicator, and a configuration index.

2. The methods, apparatuses, and articles of clause 1, wherein the groupcast indicator is transmitted at least in part via a field of a SCI format 0-1 message or a field of a SCI format 0-2 message, and wherein the SPS indicator is transmitted at least in part via one or more fields of a SCI format 0-1 message.

3. The methods, apparatuses, and articles of any of clauses 1-2, wherein the SPS indicator is transmitted at least in part by scrambling a CRC of a SCI format 0-1 message with a common SL-SPS-RNTI which is common to all UEs in sidelink communication with the first UE.

4. The methods, apparatuses, and articles of any of clauses 1-2, wherein the groupcast indicator and the SPS indicator are jointly transmitted at least in part by scrambling a CRC of a SCI format 0-1 message with a SL-SPS-group-RNTI for a group of groupcast receiver UEs consisting of the plurality of UEs.

5. The methods, apparatuses, and articles of any of clauses 1-4, wherein the SPS indicator is transmitted at least in part via one or more fields of a SCI format 0-1 message.

6. The methods, apparatuses, and articles of clause 5, wherein a CRC included in a field of the SCI format 0-1 message is scrambled using a SPS RNTI provides the SPS indicator.

7. The methods, apparatuses, and articles of clause 6, wherein the SPS RNTI is a common SL-SPS-RNTI common to all UEs in sidelink communication with the first UE.

8. The methods, apparatuses, and articles of clause 7, wherein the common SL-SPS-RNTI indicates that the SCI format 0-1 message and a corresponding SCI format 0-2 message contain SPS information for the sidelink groupcast.

9. The methods, apparatuses, and articles of clause 6, wherein the SPS RNTI is a SL-SPS-group-RNTI for a group of groupcast receiver UEs consisting of the plurality of UEs.

10. The methods, apparatuses, and articles of clause 9, wherein message destination group identifiers and zone identifiers in a SCI format 0-2 message corresponding to the SCI format 0-1 message are made available for purposes other than destination group identifiers and zone identifiers when a group indicated by the SL-SPS-group-RNTI coincides with a group indicated in the corresponding SCI format 0-2 message.

11. The methods, apparatuses, and articles of any of clauses 5-10, wherein a field of the SCI format 0-1 message defined for indicating the presence of SPS information in the SCI format 0-1 message and a corresponding SCI format 0-2 message provides the SPS indicator.

12. The methods, apparatuses, and articles of any of clauses 1-11, wherein the activation state indicator indicates either activation of the SPS of the sidelink groupcast or deactivation of the SPS of the sidelink groupcast.

13. The methods, apparatuses, and articles of any of clauses 1-12, wherein the activation state indicator is transmitted at least in part via one or more fields of a SCI format 0-1 message, one or more fields of a SCI format 0-2 message, or a combination thereof.

14. The methods, apparatuses, and articles of clause 13, wherein a combination of contents of at least one field of the SCI format 0-1 message and at least one field of the SCI format 0-2 message provides the activation state indicator.

15. The methods, apparatuses, and articles of clause 14, wherein the contents of the at least one field of the SCI format 0-1 message comprise contents indicating group SPS and the contents of the at least one field of the SCI format 0-2 message comprise a new data indicator.

16. The methods, apparatuses, and articles of clause 15, wherein the activation state indicator indicates activation of the SPS of the sidelink groupcast when the contents of at least one field of the SCI format 0-1 message indicates group SPS, the contents of the at least one field of the SCI format 0-2 message comprises a new data field value of 0, and frequency and time resource assignments for the sidelink groupcast are feasible, and wherein the activation state indicator indicates deactivation of the SPS of the sidelink groupcast when the contents of the at least one field of the SCI format 0-1 message indicate group SPS, the contents of the at least one field of the SCI format 0-2 message comprise a new data field value of 0, and frequency and time resource assignments for the sidelink groupcast are set to all 0s.

17. The methods, apparatuses, and articles of any of clauses 13-16, wherein a field of the SCI format 0-1 message or a field of the SCI format 0-2 message defined for indicating an activation state of the SPS of the sidelink groupcast provides the activation state indicator.

18. The methods, apparatuses, and articles of any of clauses 1-17, wherein the configuration index is transmitted at least in part via one or more fields of a SCI format 0-1 message, one or more fields of a SCI format 0-2 message, or a combination thereof.

19. The methods, apparatuses, and articles of clause 18, wherein the configuration index is transmitted at least in part via a field of a SCI format 0-1 message or a SCI format 0-2 message indicating a group SPS.

20. The methods, apparatuses, and articles of clause 18, wherein a combination of contents of a field of the SCI format 0-1 message indicating group SPS and a HARQ process identification field specifying an index value provides the configuration index.

21. The methods, apparatuses, and articles of clause 18, wherein a field of the SCI format 0-1 message or a field of the SCI format 0-2 message defined for indicating an index value of the configuration index provides the configuration index.

22. The methods, apparatuses, and articles of any of clauses 1-21, wherein the groupcast indicator, the SPS indicator, and the configuration index together indicate a set of parameters associated with the SPS for the sidelink groupcast including a periodicity of the sidelink groupcast or a maximum number of times that a TB for the sidelink groupcast can be transmitted.

23. The methods, apparatuses, and articles of any of clauses 1-22, wherein the configuration index provides an index to one or more parameters of a set of parameters including one or more of a SPS RNTI, a periodicity of the sidelink groupcast, or a maximum number of times that a TB for the sidelink groupcast can be transmitted.

24. The methods, apparatuses, and articles of any of clauses 1-23, further providing for transmitting, by the first UE, a first SCI format 0-1 message for the sidelink groupcast, transmitting, by the first UE, a first SCI format 0-2 message for the sidelink groupcast, wherein the SPS control signaling for the sidelink groupcast transmitted by the first UE is included in the SCI format 0-1 message, the SCI format 0-2 message, or a combination thereof, and transmitting PSSCH groupcast data for the sidelink groupcast.

25. The methods, apparatuses, and articles of any of clauses 1-24, wherein the activation state indicator indicates activation of the SPS of the sidelink groupcast, and further providing for monitoring for a feedback message from each UE of the plurality of UEs, and determining that activation of the SPS of the sidelink groupcast is incomplete if the feedback message has not been received from each UE of the plurality of UEs or that activation of the SPS of the sidelink groupcast is complete if the feedback message has been received from each UE of the plurality of UEs.

26. The methods, apparatuses, and articles of clause 25, wherein subsequent PSSCH groupcast data transmissions for the sidelink groupcast are accompanied by the first SCI format 0-1 message and the second SCI format 0-2 message when it is determined that activation of the SPS of the sidelink groupcast is incomplete.

27. The methods, apparatuses, and articles of clause 25, wherein subsequent PSSCH groupcast data transmissions for the sidelink groupcast are accompanied by no SCI or only a SCI format 0-1 message when a feedback message has been received from each UE of the plurality of UEs and activation of the SPS of the sidelink groupcast is complete.

28. The methods, apparatuses, and articles of clause 25, wherein subsequent PSSCH groupcast data transmissions for the sidelink groupcast are unaccompanied by a SCI format 0-1 message, a SCI format 0-2 message, or both when it is determined that activation of the SPS of the sidelink groupcast is complete.

29. The methods, apparatuses, and articles of clause 28, wherein sidelink resources for the sidelink groupcast are scheduled by a base station in communication with the first UE, and further providing for determining that SCI format 0-1 message contents and SCI format 0-2 message contents associated with an instance of the subsequent PSSCH groupcast data transmission are identical to contents of a respective one of the first SCI format 0-1 message and the first SCI format 0-2 message, and transmitting, by the first UE, the subsequent PSSCH groupcast data transmission for the sidelink groupcast unaccompanied by an instance of a SCI format 0-1 message and an instance of a SCI format 0-2 message.

30. The methods, apparatuses, and articles of clause 28, wherein sidelink resources for the sidelink groupcast are scheduled by the first UE, and further providing for determining that SCI format 0-1 message contents and SCI format 0-2 message contents associated with an instance of the subsequent PSSCH groupcast data transmission are identical to contents of a respective one of the first SCI format 0-1 message and the first SCI format 0-2 message, and transmitting, by the first UE, the subsequent PSSCH groupcast data transmission for the sidelink groupcast accompanied by an instance of a SCI format 0-1 message and unaccompanied by an instance of a SCI format 0-2 message.

31. The methods, apparatuses, and articles of clause 24, wherein the activation state indicator indicates activation of the SPS of the sidelink groupcast, and further providing for transmitting, by the first UE, a second SCI format 0-1 message for the sidelink groupcast, transmitting, by the first UE, a second SCI format 0-2 message for the sidelink groupcast, wherein the second SCI format 0-1 message, the second SCI format 0-2 message, or both include updated contents with respect to the first SCI format 0-1 message, the first SPS format 0-2 message, or both for reactivation of the SPS of the sidelink groupcast using a different SPS configuration, and transmitting subsequent PSSCH groupcast data for the sidelink groupcast.

32. The methods, apparatuses, and articles of clause 24, further providing for transmitting, by the first UE, a second SCI format 0-1 message for the sidelink groupcast, and transmitting, by the first UE, a second SCI format 0-2 message for the sidelink groupcast, wherein the second SCI format 0-1 message, the second SCI format 0-2 message, or a combination thereof provide an activation state indicator indicating deactivation of the SPS of the sidelink groupcast.

33. The methods, apparatuses, and articles of any of clauses 1-32, further providing for determining, by the first UE, to retransmit a groupcast TB for the sidelink groupcast based on receiving a NACK for a PSSCH groupcast data transmission for the sidelink groupcast from a UE of the plurality of UEs.

34. The methods, apparatuses, and articles of any of any of clauses 1-33, further providing for determining, by the first UE, to retransmit a groupcast TB for the sidelink groupcast based on failing to receive an ACK for a PSSCH groupcast data transmission for the sidelink groupcast from a UE of the plurality of UEs.

35. The methods, apparatuses, and articles of any of clauses 1-34, further providing for allocating, by the first UE, resources for retransmission of a groupcast TB for the sidelink groupcast, retransmitting, by the first UE, the groupcast TB, wherein a same HARQ process identification used for original transmission of the groupcast TB is used for retransmitting the groupcast TB, and wherein retransmitting the TB comprises transmitting, by the first UE, a second SCI format 0-1 message for the sidelink groupcast, transmitting, by the first UE, a second SCI format 0-2 message for the sidelink groupcast, wherein the second SCI format 0-1 message and the second SCI format 0-2 message carry the SPS control signaling for the sidelink groupcast, and retransmitting PSSCH groupcast data for the sidelink groupcast, wherein the second SCI format 0-1 message, the second SCI format 0-2 message, or both include one or more fields indicating that the PSSCH groupcast data is retransmitted data for the sidelink groupcast.

36. Methods, apparatuses, and articles for wireless communication may provide for receiving, by a UE of a plurality of UEs in communication with a first UE, a groupcast indicator for a sidelink groupcast indicating that corresponding sidelink transmissions by the first UE are groupcast to the plurality of UEs, and receiving, by the UE of the plurality of UEs, SPS control signaling for the sidelink groupcast including a SPS indicator, an activation state indicator, and a configuration index.

37. The methods, apparatuses, and articles of clause 36, wherein the groupcast indicator is received at least in part via a field of a SCI format 0-1 message or a field of a SCI format 0-2 message, and wherein the SPS indicator is received at least in part via one or more fields of a SCI format 0-1 message.

38. The methods, apparatuses, and articles of any of clauses 36-37, wherein the SPS indicator is received at least in part by a CRC of a SCI format 0-1 message scrambled with a common SL-SPS-RNTI which is common to all UEs in sidelink communication with the first UE.

39. The methods, apparatuses, and articles of any of clauses 36-37, wherein the groupcast indicator and the SPS indicator are jointly received at least in part by a CRC of a SCI format 0-1 message scrambled with a SL-SPS-group-RNTI for a group of groupcast receiver UEs consisting of the plurality of UEs.

40. The methods, apparatuses, and articles of any of clauses 36-39, wherein the SPS indicator is received at least in part via one or more fields of a SCI format 0-1 message.

41. The methods, apparatuses, and articles of clause 40, wherein a CRC included in a field of the SCI format 0-1 message is scrambled using a SPS RNTI provides the SPS indicator.

42. The methods, apparatuses, and articles of clause 41, wherein the SPS RNTI is a common SL-SPS-RNTI common to all UEs in sidelink communication with the first UE.

43. The methods, apparatuses, and articles of clause 42, wherein the common SL-SPS-RNTI indicates that the SCI format 0-1 message and a corresponding SCI format 0-2 message contain SPS information for the sidelink groupcast.

44. The methods, apparatuses, and articles of clause 41, wherein the SPS RNTI is a SL-SPS-group-RNTI for a group of groupcast receiver UEs consisting of the plurality of UEs.

45. The methods, apparatuses, and articles of clause 44, wherein message destination group identifiers and zone identifiers in a SCI format 0-2 message corresponding to the SCI format 0-1 message are used for purposes other than destination group identifiers and zone identifiers when a group indicated by the SL-SPS-group-RNTI coincides with a group indicated in the corresponding SCI format 0-2 message.

46. The methods, apparatuses, and articles of any of clauses 40-45, wherein a field of the SCI format 0-1 message defined for indicating the presence of SPS information in the SCI format 0-1 message and a corresponding SCI format 0-2 message provides the SPS indicator.

47. The methods, apparatuses, and articles of any of clauses 40-46, wherein the activation state indicator indicates either activation of the SPS of the sidelink groupcast or deactivation of the SPS of the sidelink groupcast.

48. The methods, apparatuses, and articles of any of clauses 40-47, wherein the activation state indicator is received at least in part via one or more fields of a SCI format 0-1 message, one or more fields of a SCI format 0-2 message, or a combination thereof.

49. The methods, apparatuses, and articles of clause 48, wherein a combination of contents of at least one field of the SCI format 0-1 message and at least one field of the SCI format 0-2 message provides the activation state indicator.

50. The methods, apparatuses, and articles of clause 49, wherein the contents of the at least one field of the SCI format 0-1 message comprise contents indicating group SPS and the contents of the at least one field of the SCI format 0-2 message comprise a new data indicator.

51. The methods, apparatuses, and articles of clause 50, wherein the activation state indicator indicates activation of the SPS of the sidelink groupcast when the contents of the at least one field of the SCI format 0-1 message indicates group SPS, the contents of the at least one field of the SCI format 0-2 message comprise a new data field value of 0, and frequency and time resource assignments for the sidelink groupcast are feasible, and wherein the activation state indicator indicates deactivation of the SPS of the sidelink groupcast when the contents of the at least one field of the SCI format 0-1 message indicates group SPS, the contents of the at least one field of the SCI format 0-2 message comprise a new data field value of 0, and frequency and time resource assignments for the sidelink groupcast are set to all 0s.

52. The methods, apparatuses, and articles of any of clauses 48-51, wherein a field of the SCI format 0-1 message or a field of the SCI format 0-2 message defined for indicating an activation state of the SPS of the sidelink groupcast provides the activation state indicator.

53. The methods, apparatuses, and articles of clause 36-52, wherein the configuration index is received at least in part via one or more fields of a SCI format 0-1 message, one or more fields of a SCI format 0-2 message, or a combination thereof.

54. The methods, apparatuses, and articles of clause 53, wherein the configuration index is received at least in part via a SCI format 0-1 message or a SCI format 0-2 message indicating a group SPS.

55. The methods, apparatuses, and articles of clause 53, wherein a combination of contents of the SCI format 0-1 message indicating group SPS and a HARQ process identification field specifying an index value provides the configuration index.

56. The methods, apparatuses, and articles of clause 53, wherein a field of the SCI format 0-1 message or a field of the SCI format 0-2 message defined for indicating an index value of the configuration index provides the configuration index.

57. The methods, apparatuses, and articles of any of 36-56, wherein the groupcast indicator, the SPS indicator, and the configuration index together indicate a set of parameters associated with the SPS for the sidelink groupcast including a periodicity of the sidelink groupcast or a maximum number of times that a TB for the sidelink groupcast can be transmitted.

58. The methods, apparatuses, and articles of any of clauses 36-56, wherein the configuration index provides an index to one or more parameters of a set of parameters including one or more of a SPS RNTI, a periodicity of the sidelink groupcast, or a maximum number of times that a TB for the sidelink groupcast can be transmitted.

59. The methods, apparatuses, and articles of any of clauses 36-58, further providing for receiving, by the UE of the plurality of UEs, a first SCI format 0-1 message for the sidelink groupcast, receiving, by the UE of the plurality of UEs, a first SCI format 0-2 message for the sidelink groupcast, determining if the first SCI format 0-1 message and the first SCI format 0-2 message correspond to the sidelink transmissions of the sidelink groupcast to the plurality of UEs, and analyzing the first SCI format 0-1 message, the first SCI format 0-2 message, or both for the activation state indicator indicating activation of the SPS of the sidelink groupcast or deactivation of the SPS of the sidelink groupcast.

60. The methods, apparatuses, and articles of clause 59, wherein the activation state indicator indicates activation of the SPS of the sidelink groupcast, and further providing for decoding, by the UE of the plurality of UEs, PSSCH groupcast data for the sidelink groupcast.

61. The methods, apparatuses, and articles of any of clauses 59-60, further providing for transmitting, by the UE of the plurality of UEs, an ACK or NACK for the decoding the PSSCH groupcast data irrespective of a NACK only option for PSSCH groupcast data decoding.

62. The methods, apparatuses, and articles of any of clauses 59-60, further providing for storing, by the UE of the plurality of UEs, configuration parameters for the SPS, contents of the first SCI format 0-1 message, and contents of the first SCI format 0-2 message, receiving, by the UE of the plurality of UEs, PSSCH groupcast data in accordance with the SPS, and transmitting, by the UE of the plurality of UEs, ACKs or NACKs for the PSSCH groupcast data in accordance with the SPS configuration parameters and the contents of first SCI format 0-1 message and the first SCI format 0-2 message stored by the UE of the plurality of UEs.

63. The methods, apparatuses, and articles of any of clauses 36-62, further providing for determining, by the UE of the plurality of UEs, that the SPS of the sidelink groupcast is new based at least in part on the configuration index, and storing, by the UE of the plurality of UEs, periodic procedures of the SPS in a SPS periodic procedures database.

64. The methods, apparatuses, and articles of any of clauses 36-63, further providing for determining, by the UE of the plurality of UEs, that the SPS of the sidelink groupcast is a reactivation of a SPS based at least in part on the configuration index, and updating, by the UE of the plurality of UEs, periodic procedures of the SPS in a SPS periodic procedures database.

65. The methods, apparatuses, and articles of any of clauses 36-64, wherein the activation state indicator indicates deactivation of the SPS of the sidelink groupcast, and further providing for cancelling, by the UE of the plurality of UEs, periodic procedures of the SPS, wherein the UE of the plurality of UEs ceases to periodic monitoring of the PSSCH for data of the sidelink groupcast.

66. The methods, apparatuses, and articles of any of clauses 59-65, wherein a value for the activation state indicator indicates activation of the SPS of the sidelink groupcast, and further providing for receiving, by the UE of the plurality of UEs, a second SCI format 0-1 message for the sidelink groupcast, receiving, by the UE of the plurality of UEs, a second SCI format 0-2 message for the sidelink groupcast, determining, by the UE of the plurality of UEs, that periodic procedures of the SPS remain valid based at least in part on the second SCI format 0-1 message and the second SCI format 0-2 message failing to include SPS information for the sidelink groupcast, and monitoring the PSSCH for data of the sidelink groupcast according to the periodic procedures of the SPS.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and modules described herein (e.g., the components, functional blocks, and modules in FIG. 2) may comprise processors, electronics devices, hardware devices, electronics components, logical circuits, memories, software codes, firmware codes, etc., or any combination thereof. In addition, features discussed herein relating to SPS for sidelink groupcast may be implemented via specialized processor circuitry, via executable instructions, and/or combinations thereof.

Those of skill would further appreciate that the various illustrative logical blocks, modules, circuits, and algorithm steps (e.g., the logical blocks in FIGS. 8 and 9) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   transmitting, by a first user equipment (UE), a groupcast indicator for a sidelink groupcast indicating that corresponding sidelink transmissions are groupcast to a plurality of UEs; and
   transmitting, by the first UE, semi-persistent scheduling (SPS) control signaling for the sidelink groupcast including a SPS indicator indicating presence of group SPS information, an activation state indicator indicating either activation of SPS of the sidelink groupcast or deactivation of the SPS of the sidelink groupcast, and a configuration index providing an index to one or more parameters of a set of parameters for the SPS of the sidelink groupcast.

2. The method of claim 1, wherein the groupcast indicator is transmitted at least in part via a field of a sidelink control information (SCI) format 0-1 message or a field of a SCI format 0-2 message, and wherein the SPS indicator is transmitted at least in part via one or more fields of a SCI format 0-1 message.

3. The method of claim 1, wherein the SPS indicator is transmitted at least in part by scrambling a cyclic redundancy code (CRC) of a sidelink control information (SCI) format 0-1 message with a common sidelink SPS radio network temporary identifier (SL-SPS-RNTI) which is common to all UEs in sidelink communication with the first UE.

4. The method of claim 1, wherein the groupcast indicator and the SPS indicator are jointly transmitted at least in part by scrambling a cyclic redundancy code (CRC) of a sidelink control information (SCI) format 0-1 message with a sidelink SPS group-specific radio network temporary identifier (SL-SPS-group-RNTI) for a group of groupcast receiver UEs consisting of the plurality of UEs.

5. The method of claim 1, wherein the activation state indicator is transmitted at least in part via a combination of contents of at least one field of a sidelink control information (SCI) format 0-1 message and at least one field of a SCI format 0-2 message.

6. The method of claim 1, wherein the configuration index is transmitted at least in part via a field of a sidelink control information (SCI) format 0-1 message or a SCI format 0-2 message indicating a group SPS.

7. The method of claim 1, wherein the groupcast indicator, the SPS indicator, and the configuration index together indicate a set of parameters associated with the SPS for the sidelink groupcast including a periodicity of the sidelink groupcast or a maximum number of times that a transport block (TB) for the sidelink groupcast can be transmitted.

8. The method of claim 1, wherein the activation state indicator indicates activation of the SPS of the sidelink groupcast, and wherein subsequent physical sidelink shared channel (PSSCH) groupcast data transmissions for the sidelink groupcast are accompanied by a first sidelink control information (SCI) format 0-1 message and a second SCI format 0-2 message when a feedback message has not been received from each UE of the plurality of UEs and activation of the SPS of the sidelink groupcast is incomplete.

9. The method of claim 1, wherein the activation state indicator indicates activation of the SPS of the sidelink groupcast, and wherein subsequent physical sidelink shared channel (PSSCH) groupcast data transmissions for the sidelink groupcast are accompanied by no sidelink control information (SCI) or only a SCI format 0-1 message when a feedback message has been received from each UE of the plurality of UEs and activation of the SPS of the sidelink groupcast is complete.

10. The method of claim 1, further comprising:
allocating, by the first UE, resources for retransmission of a groupcast transport block (TB) for the sidelink groupcast;
retransmitting, by the first UE, the groupcast TB, wherein a same hybrid automatic repeat request (HARQ) process identification used for original transmission of the groupcast TB is used for retransmitting the groupcast TB, and wherein retransmitting the TB comprises:
transmitting, by the first UE, a second SCI format 0-1 message for the sidelink groupcast;
transmitting, by the first UE, a second SCI format 0-2 message for the sidelink groupcast, wherein the second SCI format 0-1 message and the second SCI format 0-2 message carry the SPS control signaling for the sidelink groupcast; and
retransmitting physical sidelink shared channel (PSSCH) groupcast data for the sidelink groupcast, wherein the second SCI format 0-1 message, the second SCI format 0-2 message, or both include one or more fields indicating that the PSSCH groupcast data is retransmitted data for the sidelink groupcast.

11. An apparatus configured for wireless communication, the apparatus comprising:
at least one processor; and
a memory in electrical communication with the at least one processor, wherein the at least one processor is configured cause the apparatus to:
transmit a groupcast indicator for a sidelink groupcast indicating that corresponding sidelink transmissions by a first user equipment (UE) are groupcast to a plurality of UEs; and
transmit semi-persistent scheduling (SPS) control signaling for the sidelink groupcast including a SPS indicator indicating presence of group SPS information, an activation state indicator indicating either activation of SPS of the sidelink groupcast or deactivation of the SPS of the sidelink groupcast, and a configuration index providing an index to one or more parameters of a set of parameters for the SPS of the sidelink groupcast.

12. The apparatus of claim 11, wherein the activation state indicator is transmitted at least in part via a combination of contents of at least one field of a sidelink control information (SCI) format 0-1 message and at least one field of a SCI format 0-2 message.

13. The apparatus of claim 11, wherein the configuration index is transmitted at least in part via a field of a sidelink control information (SCI) format 0-1 message or a SCI format 0-2 message indicating group SPS.

14. The apparatus of claim 11, wherein the activation state indicator indicates activation of the SPS of the sidelink groupcast, wherein subsequent physical sidelink shared channel (PSSCH) groupcast data transmissions for the sidelink groupcast are accompanied by a first sidelink control information (SCI) format 0-1 message and a second SCI format 0-2 message when a feedback message has not been received from each UE of the plurality of UEs and activation of the SPS of the sidelink groupcast is incomplete, and wherein subsequent PSSCH groupcast data transmissions for the sidelink groupcast are accompanied by no SCI or only a SCI format 0-1 message when a feedback message has been received from each UE of the plurality of UEs and activation of the SPS of the sidelink groupcast is complete.

15. The apparatus of claim 11, wherein the at least one processor is further configured to cause the apparatus to:
allocate resources for retransmission of a groupcast transport block (TB) for the sidelink groupcast;
retransmit, by the first UE, the groupcast TB, wherein a same hybrid automatic repeat request (HARQ) process identification used for original transmission of the groupcast TB is used for retransmitting the groupcast TB, and wherein the at least one processor configured to retransmit the TB is configured to:
transmit a second SCI format 0-1 message for the sidelink groupcast;
transmit a second SCI format 0-2 message for the sidelink groupcast, wherein the second SCI format 0-1 message and the second SCI format 0-2 message carry the SPS control signaling for the sidelink groupcast; and
retransmit physical sidelink shared channel (PSSCH) groupcast data for the sidelink groupcast, wherein the second SCI format 0-1 message, the second SCI format 0-2 message, or both include one or more fields indicating that the PSSCH groupcast data is retransmitted data for the sidelink groupcast.

16. A method of wireless communication, comprising:
receiving, by a user equipment (UE) of a plurality of UEs from a first UE, a groupcast indicator for a sidelink groupcast indicating that corresponding sidelink transmissions by the first UE are groupcast to the plurality of UEs; and
receiving, by the UE of the plurality of UEs from the first UE, semi-persistent scheduling (SPS) control signaling for the sidelink groupcast including a SPS indicator indicating presence of group SPS information, an activation state indicator indicating either activation of SPS of the sidelink groupcast or deactivation of the SPS of the sidelink groupcast, and a configuration index providing an index to one or more parameters of a set of parameters for the SPS of the sidelink groupcast.

17. The method of claim 16, wherein the groupcast indicator is received at least in part via a field of a sidelink control information (SCI) format 0-1 message or a field of a SCI format 0-2 message, and wherein the SPS indicator is received at least in part via one or more fields of a SCI format 0-1 message.

18. The method of claim 16, wherein the SPS indicator is received at least in part by a cyclic redundancy code (CRC) of a sidelink control information (SCI) format 0-1 message scrambled with a common sidelink SPS radio network temporary identifier (SL-SPS-RNTI) which is common to all UEs in sidelink communication with the first UE.

19. The method of claim 16, wherein the groupcast indicator and the SPS indicator are jointly received at least in part by a cyclic redundancy code (CRC) of a sidelink control information (SCI) format 0-1 message scrambled with a sidelink SPS group-specific radio network temporary identifier (SL-SPS-group-RNTI) for a group of groupcast receiver UEs consisting of the plurality of UEs.

20. The method of claim 16, wherein the activation state indicator is received at least in part via a combination of contents of at least one field of a sidelink control information (SCI) format 0-1 message and at least one field of a SCI format 0-2 message.

21. The method of claim 16, wherein the configuration index is received at least in part via a sidelink control information (SCI) format 0-1 message or a SCI format 0-2 message indicating a group SPS.

22. The method of claim 16, wherein the groupcast indicator, the SPS indicator, and the configuration index together indicate a set of parameters associated with the SPS for the sidelink groupcast including a periodicity of the sidelink groupcast or a maximum number of times that a transport block (TB) for the sidelink groupcast can be transmitted.

23. The method of claim 16, further comprising:
receiving, by the UE of the plurality of UEs, a first sidelink control information (SCI) format 0-1 message for the sidelink groupcast; and
receiving, by the UE of the plurality of UEs, a first SCI format 0-2 message for the sidelink groupcast, wherein the first SCI format 0-1 message and the first SCI format 0-2 message correspond to the sidelink transmissions of the sidelink groupcast to the plurality of UEs, and wherein the first SCI format 0-1 message, the first SCI format 0-2 message, or both are configured for providing the activation state indicator indicating activation of the SPS of the sidelink groupcast or deactivation of the SPS of the sidelink groupcast.

24. The method of claim 23, wherein a value for the activation state indicator indicates activation of the SPS of the sidelink groupcast, and further comprising:
receiving, by the UE of the plurality of UEs, a second SCI format 0-1 message for the sidelink groupcast; and
receiving, by the UE of the plurality of UEs, a second SCI format 0-2 message for the sidelink groupcast, wherein periodic procedures of the SPS remain valid based at least in part on the second SCI format 0-1 message and the second SCI format 0-2 message failing to include SPS information for the sidelink groupcast.

25. The method of claim 16, wherein the activation state indicator indicates activation of the SPS of the sidelink groupcast, and further comprising:
decoding, by the UE of the plurality of UEs, physical sidelink shared channel (PSSCH) groupcast data for the sidelink groupcast; and
transmitting, by the UE of the plurality of UEs, an acknowledgement (ACK) or negative acknowledgment (NACK) for the decoding the PSSCH groupcast data irrespective of a NACK only option for PSSCH groupcast data decoding.

26. An apparatus configured for wireless communication, the apparatus comprising:
at least one processor; and
a memory in electrical communication with the at least one processor, wherein the at least one processor is configured to cause the apparatus to:
receive a groupcast indicator for a sidelink groupcast by a first user equipment (UE) to a plurality of UEs in communication with a first UE indicating that corresponding sidelink transmissions by the first UE are groupcast to the plurality of UEs; and
receive semi-persistent scheduling (SPS) control signaling for the sidelink groupcast including a SPS indicator indicating presence of group SPS information, an activation state indicator indicating either activation of SPS of the sidelink groupcast or deactivation of the SPS of the sidelink groupcast, and a configuration index providing an index to one or more parameters of a set of parameters for the SPS of the sidelink groupcast.

27. The apparatus of claim 26, wherein the activation state indicator is received at least in part via a combination of contents of at least one field of a sidelink control information (SCI) format 0-1 message and at least one field of a SCI format 0-2 message.

28. The apparatus of claim 26, wherein the configuration index is received at least in part via a field of a sidelink control information (SCI) format 0-1 message or a SCI format 0-2 message indicating group SPS.

29. The apparatus of claim 26, wherein the at least one processor is further configured cause the apparatus to:
receive a first sidelink control information (SCI) format 0-1 message for the sidelink groupcast;
receive a first SCI format 0-2 message for the sidelink groupcast, wherein the first SCI format 0-1 message and the first SCI format 0-2 message correspond to the sidelink transmissions of the sidelink groupcast to the plurality of UEs, and wherein the first SCI format 0-1 message, the first SCI format 0-2 message, or both are configured for providing the activation state indicator indicating activation of the SPS of the sidelink groupcast or deactivation of the SPS of the sidelink groupcast.

30. The apparatus of claim 26, wherein the activation state indicator indicates activation of the SPS of the sidelink groupcast, and wherein the at least one processor is further configured to cause the apparatus to:
- decode physical sidelink shared channel (PSSCH) groupcast data for the sidelink groupcast; and
- transmit an acknowledgement (ACK) or negative acknowledgment (NACK) for decoding the PSSCH groupcast data irrespective of a NACK only option for PSSCH groupcast data decoding.

* * * * *